United States Patent
Takagi et al.

[11] Patent Number: 5,434,640
[45] Date of Patent: Jul. 18, 1995

[54] EXPOSURE CALCULATION DEVICE FOR CAMERA

[75] Inventors: Tadao Takagi, Yokohama; Hiroyuki Iwasaki, Kawasaki, both of Japan

[73] Assignee: Nikon Corporation, Tokyo, Japan

[21] Appl. No.: 104,619

[22] Filed: Aug. 11, 1993

[30] Foreign Application Priority Data

Aug. 12, 1992 [JP] Japan ................... 4-215295
Sep. 25, 1992 [JP] Japan ................... 4-256966

[51] Int. Cl.⁶ .......................................... G03B 7/08
[52] U.S. Cl. .............................. 354/432; 354/289.1
[58] Field of Search ............. 354/429, 432, 289.1, 354/286

[56] References Cited

U.S. PATENT DOCUMENTS

| | | |
|---|---|---|
| Re. 32,376 | 3/1987 | Fukuhara et al. ............ 354/432 |
| 4,306,787 | 12/1981 | Fukuhara et al. ............ 354/289.1 |
| 4,529,288 | 7/1985 | Nakai et al. .................. 354/286 |
| 4,833,498 | 5/1989 | Kato et al. ..................... 354/286 |
| 4,977,424 | 12/1990 | Mukai et al. .................. 354/432 |
| 4,984,007 | 1/1991 | Takagi ............................. 354/432 |
| 4,985,726 | 1/1991 | Fujibayashi et al. ......... 354/432 |
| 5,012,268 | 4/1991 | Hirai ............................... 354/286 |

FOREIGN PATENT DOCUMENTS 57-84441 5/1982 Japan .

Primary Examiner—Russell E. Adams
Attorney, Agent, or Firm—Oliff & Berridge

[57] ABSTRACT

The exposure calculation device for camera comprises a first photometric means which performs photometry on the photographic field divided into a plurality of regions and a second photometric means for which by comparison with the first photometric means the separation number is lower and which excels at low luminance photometric performance, and a calculation means which calculates an exposure value in a comparatively high luminance situation by dominantly using the output of the first photometric means and in a comparatively low illumination situation by dominantly using the output of the second photometric means; and it is possible to obtain an accurate exposure value, even in a special environment such as a high temperature situation or low luminance or the like.

13 Claims, 27 Drawing Sheets

FIG. 17

| Bmax / ΔBV | Bmax < 5 | 5 ≤ Bmax < 8 | 8 ≤ Bmax |
|---|---|---|---|
| ΔBV ≤ 2 | SC-1 | SC-2 | SC-3 |
| 2 < ΔBV ≤ 4 | SC-4 | SC-5 | SC-6 |
| 4 < ΔBV | SC-7 | SC-8 | SC-9 |

FIG. 18

| WEIGHTING COEFFICIENT / SCENE CLASSIFICATION | W 1 | W 2 | W 3 | W 4 | W 5 | W 6 |
|---|---|---|---|---|---|---|
| SC-1 | W11 | W12 | W13 | W14 | W15 | W16 |
| SC-2 | W21 | W22 | W23 | W24 | W25 | W26 |
| SC-3 | W31 | W32 | W33 | W34 | W35 | W36 |
| SC-4 | W41 | W42 | W43 | W44 | W45 | W46 |
| SC-5 | W51 | W52 | W53 | W54 | W55 | W56 |
| SC-6 | W61 | W62 | W63 | W64 | W65 | W66 |
| SC-7 | W71 | W72 | W73 | W74 | W75 | W76 |
| SC-8 | W81 | W82 | W83 | W84 | W85 | W86 |
| SC-9 | W91 | W92 | W93 | W94 | W95 | W96 |

FIG. 19

| WEIGHTING COEFFICIENT / SCENE CLASSIFICATION | G 1 | G 2 | G 3 | G 4 | G 5 | G 6 |
|---|---|---|---|---|---|---|
| SC-1 | G11 | G12 | G13 | G14 | G15 | G16 |
| SC-2 | G21 | G22 | G23 | G24 | G25 | G26 |
| SC-3 | G31 | G32 | G33 | G34 | G35 | G36 |
| SC-4 | G41 | G42 | G43 | G44 | G45 | G46 |
| SC-5 | G51 | G52 | G53 | G54 | G55 | G56 |
| SC-6 | G61 | G62 | G63 | G64 | G65 | G66 |
| SC-7 | G71 | G72 | G73 | G74 | G75 | G76 |
| SC-8 | G81 | G82 | G83 | G84 | G85 | G86 |
| SC-9 | G91 | G92 | G93 | G94 | G95 | G96 |

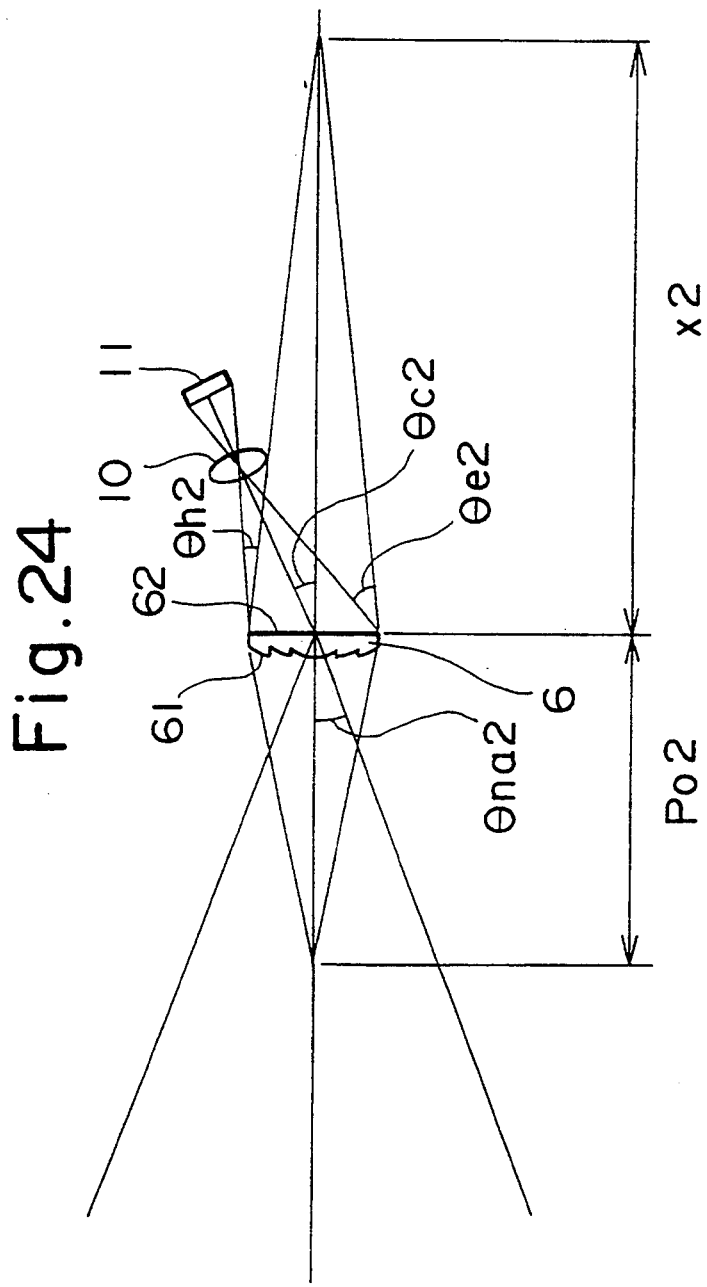

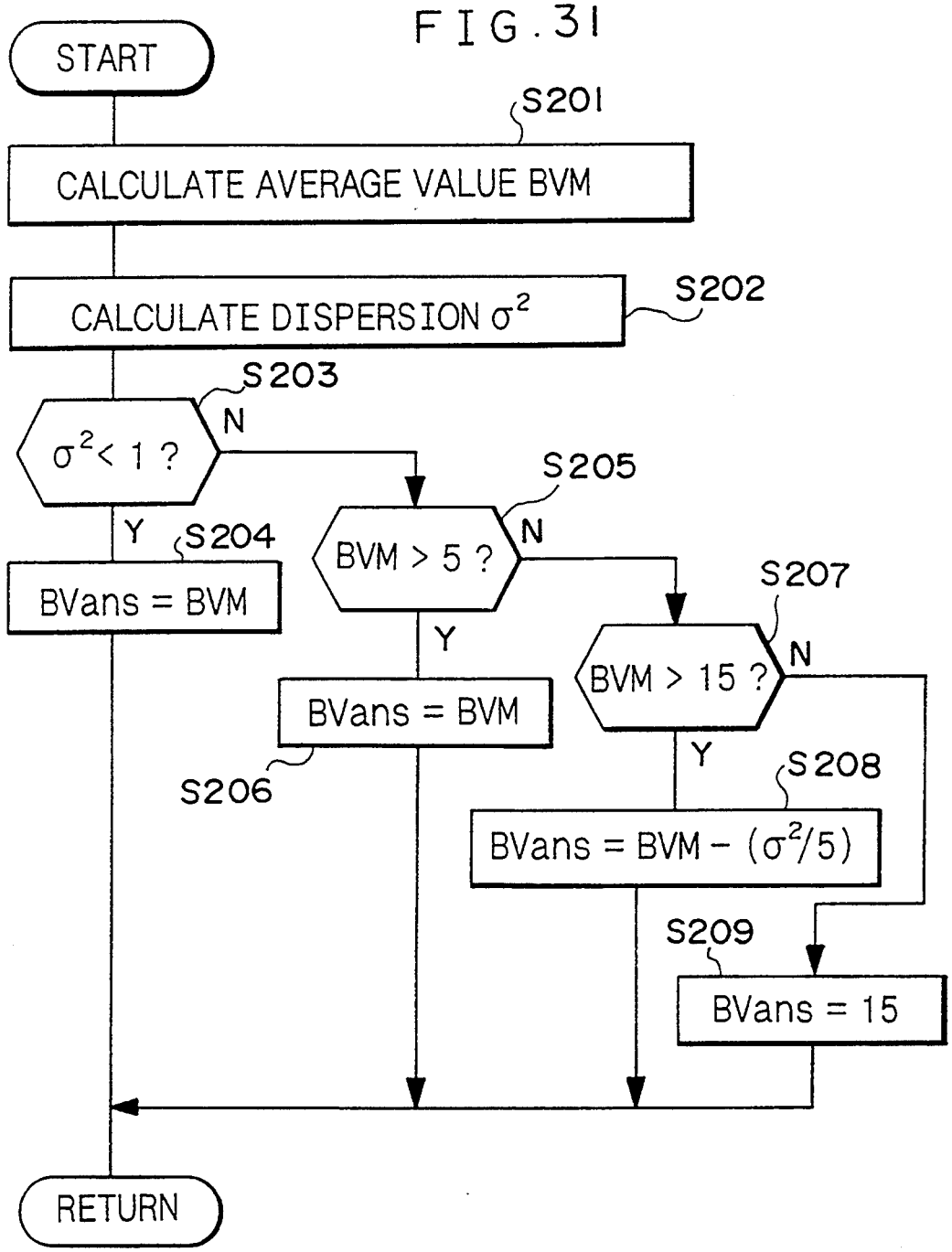

EXPOSURE CALCULATION DEVICE FOR CAMERA

BACKGROUND OF THE INVENTION

1. Field of the Invention

The present invention relates to an exposure calculation device for a camera, which calculates an exposure value from photometric data obtained by divided photometry of light transmitted through a photographic lens.

2. Description of the Related Art

In Japanese Patent Laying-Open Publication 57-84441 a camera is disclosed which, using a CCD or a MOS or the like type of image sensor, obtains an exposure value for the camera by dividing up the photographic field finely and into a large number of regions and by performing photometry on the divided photographic field.

However, with a sensor of the type in which the outputs of the photoelectric device are accumulated as electric charges for a predetermined time period and then the accumulated charges are read out in order, since a relatively high bias voltage is supplied to the photoelectric device, the dark current is increased, and the noise level is elevated, and the problem arises that the photometric capability in low luminance is bad. This problem becomes particularly great in a high temperature situation.

Further, in U.S. Pat. No. 4,977,424, a camera is disclosed in which, along with obtaining photometric data by performing photometry on light transmitted through the photographic lens, a compensation value is calculated for the above described photometric data based upon the exit pupil and the open aperture value of the photographic lens, and an exposure value is calculated according to the photometric data corrected according to this compensation value. Here, the exit pupil and the open aperture value may for example be read in from an in-lens ROM included in the photographic lens.

However, in the case of so called divided photometry in which photometry is performed by dividing up the photographic field into a plurality of photometric regions, since it is necessary to calculate the above described compensation values for each of the plurality of photometric regions, not only does the time period for compensation calculation of the photometric data by the compensation values become increased, but also the cost is increased because it becomes necessary to provide a memory of high capacity for recording the compensated plurality of photometric data items. Further, with a divided photometric device, because the amount of light arriving at a portion corresponding to the peripheral portion of the photographic plane is low in comparison with the central portion, the problem arises that the reliability is deteriorated, since the finer the division of the element becomes, the larger become the compensation values corresponding to the photometric data from the peripheral portion.

SUMMARY OF THE INVENTION

Since the exposure calculation device for camera according to the present invention comprises a first photometric device that performs photometry on the photographic field divided into a plurality of regions and a second photometric device for which by comparison with the first photometric device the separation number is lower and which excels at low luminance photometric performance, and a calculation device that calculates an exposure value in a comparatively high luminance situation by dominantly using the output of the first photometric device, and in a comparatively low luminance situation by dominantly using the output of the second photometric device, thereby it is the object of the present invention, since photometry is performed in a comparatively high luminance situation by dividing up the photographic field finely and therefore into a large number of regions, to obtain a proper exposure value with an extremely high probability and thus or in a special environment such as a situation of comparatively low luminance, high temperature or the like to obtain a proper exposure value or one close thereto.

Further, since the exposure calculation device for camera according to the present invention comprises a photometric device that performs photometry separately for a plurality of photometric regions upon light from an object to be photographed which has passed through a photographic lens into which the photographic field is divided and outputs respectively corresponding photometric data values, a compensation value calculation device that, based upon at least information related to the exit pupil of the photographic lens and information related to the open aperture value, respectively calculates compensation values for compensation of each of the photometric data values, a decision device that, based upon the compensation values calculated by the compensation value calculation device, decides whether each of the respective photometric data values is valid or invalid, and a calculation device that, for those of the photometric data values judged as valid, calculates exposure values based upon the respective values compensated according to the compensation values corresponding to these photometric data values, it is the object of the present of the invention to perform the compensation calculation processing in a short time period.

Another object is, when a calculated compensation value is greater than a predetermined value, to consider the photometric data value associated with this compensation value as invalid.

Further, the exposure calculation device for a camera according to the present invention is so constructed as, when a photometric data value is less than a predetermined value, to decide that this photometric data value is invalid.

Another objective is to calculate a parameter for obtaining an appropriate exposure value using a photometric data value for a region decided to be valid by the decision device, and to calculate an exposure value using this parameter.

Another objective is for that parameter to be an average luminance value.

Another objective is for the parameter to be a dispersion of luminance value.

Another objective is to use a photometric device equipped with a light receiving element of the charge accumulation type.

Yet further, the exposure calculation device for camera according to the present invention comprises a photometric device, a compensation value calculation device, and a calculation device that calculates an exposure value based upon the compensation values calculated by this compensation device, wherein the compensation value calculation device is constructed so as to change the compensation values in proportion to the distance from a standard on position on the photographic field to the photometric region which is to be the subject of compensation; or wherein the compensation value calculation device is constructed so as to change the compensation values in proportion to the open aperture value of the photographic lens.

As above, according to the present invention, since a first photometric device which divides the photographic field into a plurality of regions and performs photometry, and a second photometric device for which by comparison with the said first photometric device the separation number is lower and which excels at low luminance photometric performance, are provided, and since the exposure calculation device for a camera is constructed so as to calculate an exposure value in a comparatively high luminance situation by dominantly using the output of the said first photometric device, and in a comparatively low luminance situation by dominantly using the output of the second photometric device, thereby, since photometry is performed in comparatively high luminance by dividing up the photographic field finely and therefore into many regions, a proper exposure will be obtained with an extremely high probability; and it also becomes possible to obtain a proper exposure or one close to it, even in a special environment like a situation of comparatively low luminance or high temperature or the like.

Further, the validity ratio $\eta$ is calculated, and according to it a contribution ratio to the final exposure value of the two kinds of exposure value obtained from the two kinds of photometric system is determined, so that, since the final exposure value is determined by a process of combination calculation, no abrupt stepwise change occurs when changing over, although the two different kinds of photometric system are being used.

According to the present invention, since each of the photometric data values is judged to be valid or invalid based upon a compensation value which is calculated based upon at least information related to the exit pupil of the photographic lens and information related to the open aperture value, and an exposure value is calculated for those of the photometric data values judged as valid based upon the respective values compensated according to the compensation values corresponding to these photometric data values, therefore not only can the calculation processing be performed in a short time period since it is not necessary to perform compensation for all of the photometric data items, but also a small capacity memory is sufficient for storage of the compensated values, so that reduction of cost can be envisaged. Further, by taking as invalid those photometric data items for which it is judged that the reliability is low because the compensation values are high, it is possible to obtain an accurate exposure value, and increased reliability can be expected.

According to another aspect of the invention, since the construction is such that when a photometric data value is less than a predetermined value (and it is considered that the noise component is great so that the credibility is low) this photometric data value is taken as invalid, thereby an even greater increase of the level of reliability can be expected.

According to yet another aspect of the invention, since the construction is such that an average brightness value is calculated using a photometric data value for a region decided to be valid, and an exposure value is calculated based upon this average brightness value, thereby it becomes possible to calculate an accurate exposure value according to the photographic environment such as in the day time, in the evening, at night, or at the sea shore or on a snowy mountain.

According to still yet another aspect of the invention, since the construction is such that the dispersion of luminance value is calculated using a photometric data value for a region decided to be valid, and an exposure value is calculated based upon this dispersion, thereby it becomes possible to calculate an accurate exposure value according to the magnitude of the luminance variation for the various regions, or the level of backlight.

Further, according to yet another aspect of the invention, since the construction is such that the above described compensation values are changed in proportion to the distance from a standard position on the photographic field to the photometric region which is to be the subject of compensation, a compensation value of high reliability can be obtained regardless of the position on the photographic plane.

Further, according to yet another aspect of the invention, since the construction is such that the compensation values are changed in proportion to the open aperture value of the photographic lens, a compensation value of high reliability can be obtained regardless of the brightness of the photographic lens.

BRIEF DESCRIPTION OF THE DRAWINGS

FIG. 17 is a scene classification table.

FIG. 18 is a figure showing the relationship between the classified scene and weighting coefficients W.

FIG. 19 is a figure showing the relationship between the classified scene and weighting coefficients G.

FIG. 24 is a figure showing the photometric optical system.

FIG. 31 is a flow chart showing the details of exposure calculation.

DESCRIPTION OF THE PREFERRED EMBODIMENT

The first embodiment of the present invention will now be described with reference to FIGS. 1 through 16.

Figure 1:
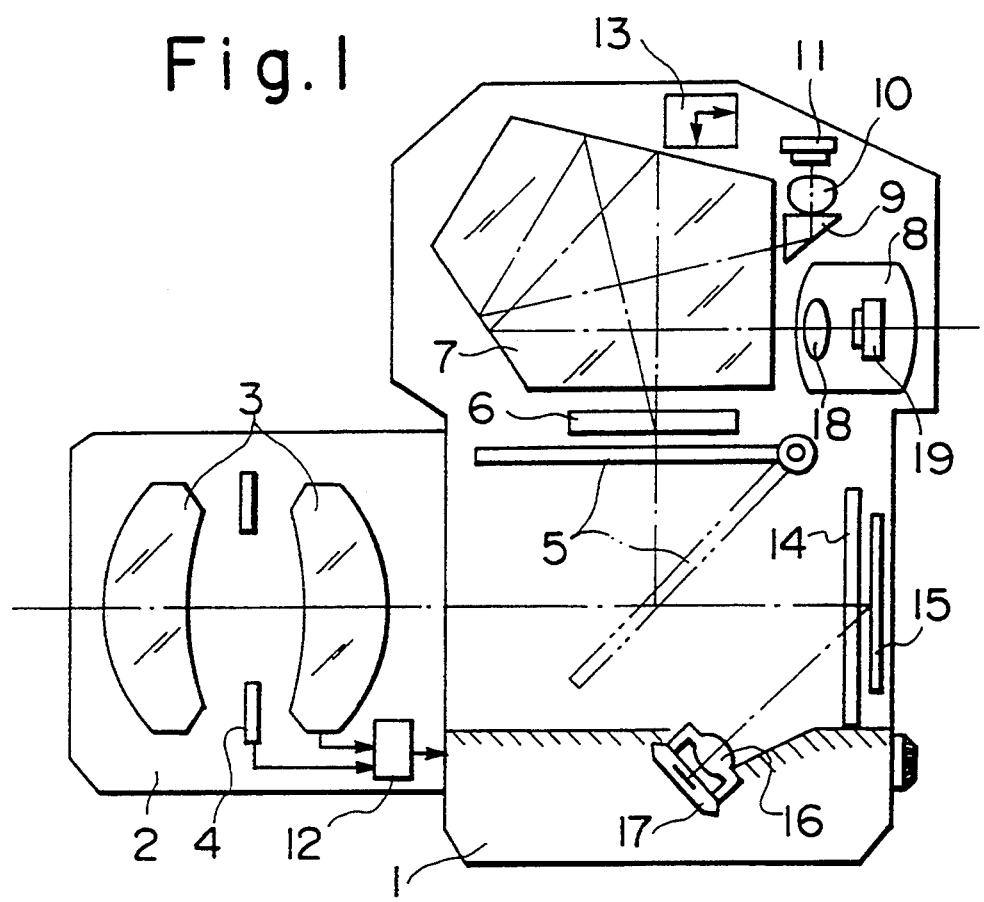
FIG. 1 is a sectional view of a camera which comprises an exposure calculation device according to the present invention.
Figure 4:
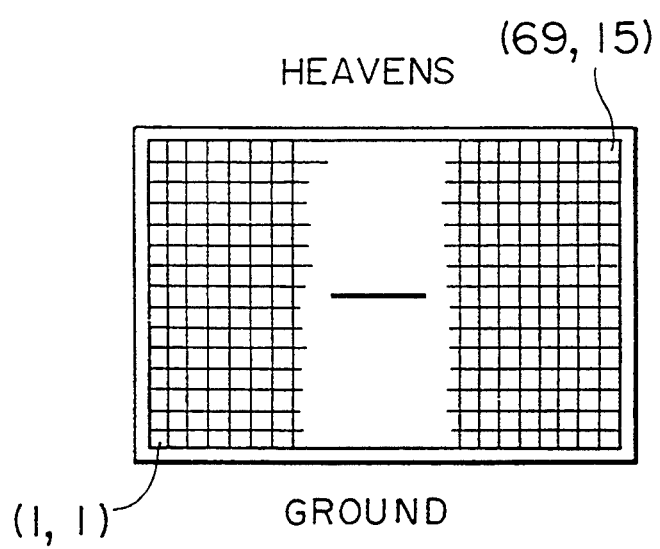
FIG. 4 is a figure showing the pattern of division when the luminance of the photographic plane is being subjected to photometry.
Figure 5:
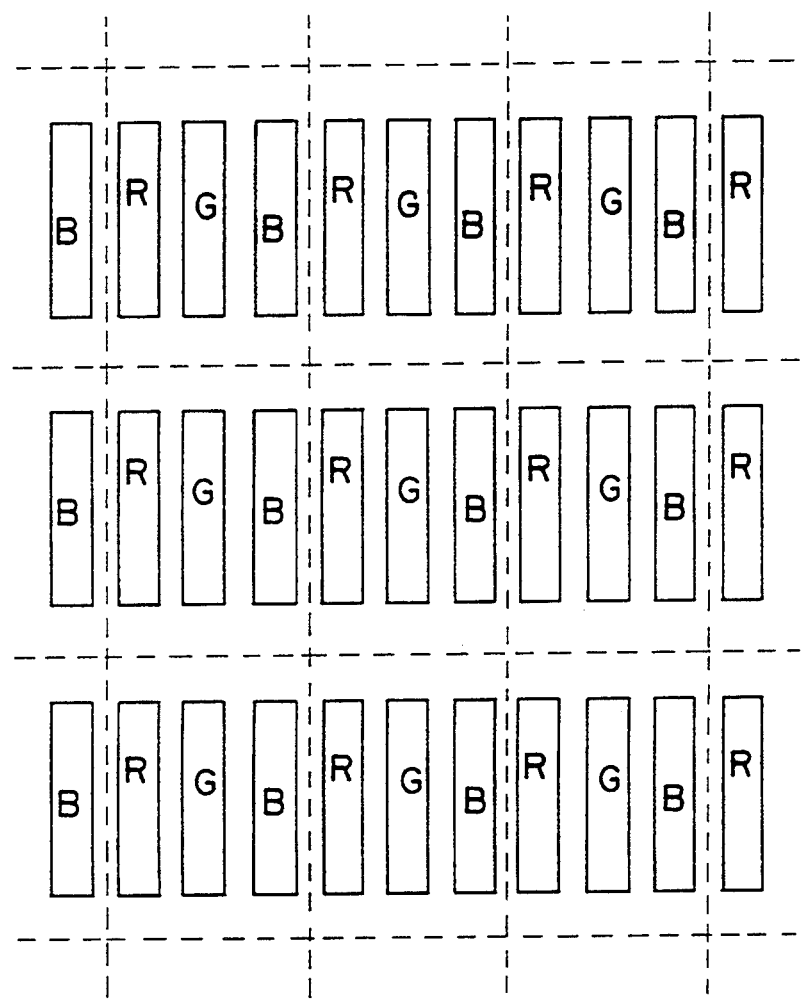
FIG. 5 is a figure showing the arrangement of color filters which are placed on photoelectric elements of the photometric device 11.

FIG. 1 is a sectional view of a camera equipped with an exposure calculation device according to the present invention. When looking through the viewfinder, a light beam from the photographic field, reflected from a main mirror 5 (shown by dotted lines) of a camera body 1, passes through a photographic lens 3 and a diaphragm 4 in a photographic lens barrel 2, passes through a screen 6, a pentaprism 7, and an eyepiece lens 8, and arrives at the eyeball of the photographer. Further, a portion of the light beam passes through a prism 9 and a condenser lens 10 from the pentaprism 7 and arrives at a photometric device 11. The photometric device 11 is a two dimensional color CCD used in a video camera or the like, and as shown in FIG. 4 is divided up into 1035 regions, 69 horizontally by 15 vertically; and, the photometric device 11 is constructed so as not only to be able to measure luminance, but also, as shown in FIG. 5, to be able to measure colors according to repeated disposition of filters of the three colors R, G, and B.

Further, a different portion of the light beam passes from the pentaprism 7 through a condenser lens 18 and arrives at a photometric device 19. The photometric device 19 is an SPD as used for photometry in a camera according to the prior art, and its output is provided as an electric current. The purpose of this photometric device 19 is in order that the photometric device can be changed over from the device 11 to device 19, in a case such when a number of the photoelectric elements of the photometric device 11 are illuminated with light of extremely high luminance and go into the overload state so that the output of a large number of the region is adversely affected. The photometric device 19 of this embodiment is constituted so as to divide the photographic field into five regions for the purposes of photometry, but it would also be acceptable to use an element of unitary photometric type.

An in-lens ROM 12 communicates photographic distance information X obtained from the position of the photographic lens 3 and lens data such as information relating to the opening amount of the diaphragm 4 and the like to the camera body 1.

An attitude determination element 13 determines the attitude of the camera body 1.

A photometric device 17 is an element for flash photometry and is employed for light adjustment when a flash device is used. A light beam emanating from the flash device is reflected from the photographic field and passes through the photographic lens 3 and the diaphragm 4 and a shutter 14 and is reflected from a film surface 15, and passes through a condenser lens 16 for flash photometry to arrive at the photometric device 17 for flash photometry.

Figure 2:
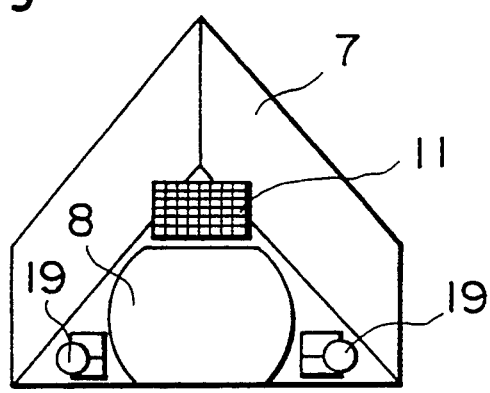
FIG. 2 is an embodiment of the arrangement of the photometric devices 11 and 19.

FIG. 2 is an embodiment of the arrangement of the photometric devices 11 and 19. FIG. 2 is shown to explain the arrangement thereof, and FIG. 2 shows the pentaprism 7 as seen from the side of the eyepiece lens 8. Now, FIG. 2 is drawn somewhat differently from FIG. 1 as far as the direction of the devices etc. is concerned. In contrast to the photometric device 11 which performs photometry using a light beam from the upper side of the eyepiece lens 8, the photometric device 19 performs photometry using light beams from both the left and the right sides of the eyepiece lens. Photometry is performed according to division into a total of 5 regions—the central portion and its neighboring 4 peripheral regions—and for the central portion a pair of left and right elements are superimposed on the photometric region, and their outputs are combined to provide the output from the central portion.

Figure 3:
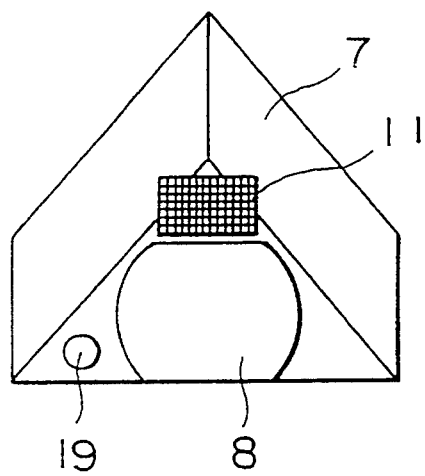
FIG. 3 is another embodiment of the arrangement of the photometric devices 11 and 19.

FIG. 3 is another embodiment of the arrangement of the photometric devices 11 and 19. This FIG. 3 shows the pentaprism 7 as seen from the side of the eyepiece lens 8, and because FIG. 3 is shown, to explain the arrangement, it is drawn somewhat differently from FIG. 1 as far as the direction of the devices etc. is concerned. In contrast to the photometric device 11 which performs photometry using a light beam from the upper side of the eyepiece lens 8, the photometric device 19 performs photometry using light beams from the left side of the eyepiece lens. Photometry is performed without any division into regions, according to a single unitary region.

FIG. 4 is a figure showing the division pattern when measuring the luminance over the photographic field. The photometric device 11 measures the luminance of an image in the photographic field across the condenser lens 10 on the screen 6 by dividing it up as shown in the figure. The division pattern is 1035 divisions, 69 horizontally by 15 vertically. As for the addresses of these regions, with the camera body 1 being positioned in the horizontal orientation, the lower leftmost is taken as (1,1) while the upper rightmost is taken as (69,15).

FIG. 5 is a figure showing the arrangement of color filters placed on the individual photoelectric elements of the photometric device 11. On the 1035 regions divided as explained in FIG. 4 filters of the three colors R, G, and B are repeatedly disposed as shown in FIG. 5, and in this way the construction becomes able to perform photometry by separating into the three primary colors. Now, there would be no problem with complementary colors, rather than the primary colors R, G, and B.

Figure 6:
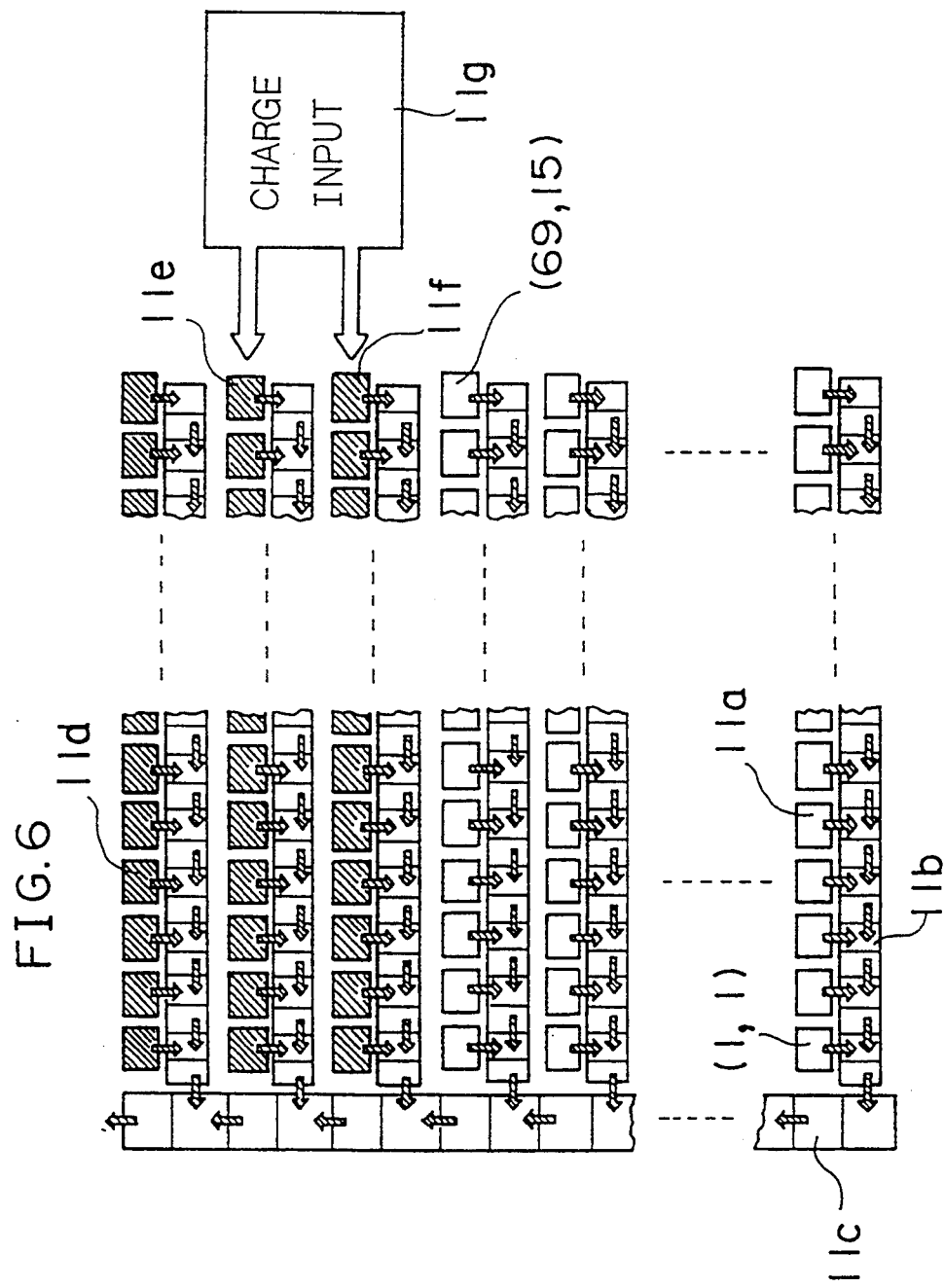
FIG. 6 is a figure showing the construction of the photometric device 11.

FIG. 6 is a figure showing the construction of the photometric device 11.

The photoelectric elements (photodiodes) 11a form 69 columns arranged horizontally, and 15 rows arranged vertically. At the bottoms of the columns there are provided shift registers 11b (called "H registers") arranged along the horizontal direction, and the electric charges generated by the photoelectric elements 11a by photoelectric conversion are accumulated for a predetermined time period by a charge accumulation section (not shown in the figures) and then are simultaneously transferred to the H registers. According to a clock pulse, the H registers transfer their charges in order in the leftward direction. At the left end of the H registers there is provided a V register 11c, and this transfers the electric charges received by transfer from the H registers 11b in the upwards direction, and they are converted to voltages by a floating diffusion amplifier not shown in the figures, and afterwards are output to an amplifier.

An optically black portion (optical black: OPB) 11d is provided for cutting off the light from the surface of the photoelectric elements 11a, so that they output a dark current. Except for the optically black portion, the construction is identical to that described above, and the method of reading out is also identical. The purpose of this dark current is that, by subtracting its value from the outputs of the photoelectric elements 11a, compensation for the level of the dark current (OPB compensation) can be performed.

When a light beam of high luminance which exceeds a predetermined level is incident upon one or more of the photoelectric elements 11a, an overflow is thereby generated, and, via the H register, may exert an influence upon other outputs of the column which include the elements upon which the light beam of high luminance is incident. Further, if a large number of these overflows occur, an influence may also be exerted from the H register by way of the V register on other ones of the H registers.

Other optically black portions (optical black: OPB) 11e and 11f are also provided for cutting off the light from the surface, and electric charges of mutually differing predetermined amounts are respectively input from a charge input unit 11g to the 11e column and to the 11f column. Since the output corresponding to the temperature of the elements is obtained from the outputs of these columns, it is possible to perform compensation for fluctuations in output due to temperature of elements and an amplifying circuit not shown in the figures which amplifies the photometric output from the photometric device 11. The two columns 11e and 11f are provided in order to make it possible also to perform fluctuation compensation, not only by level offset compensation, but also by γ slope compensation.

Figure 7:
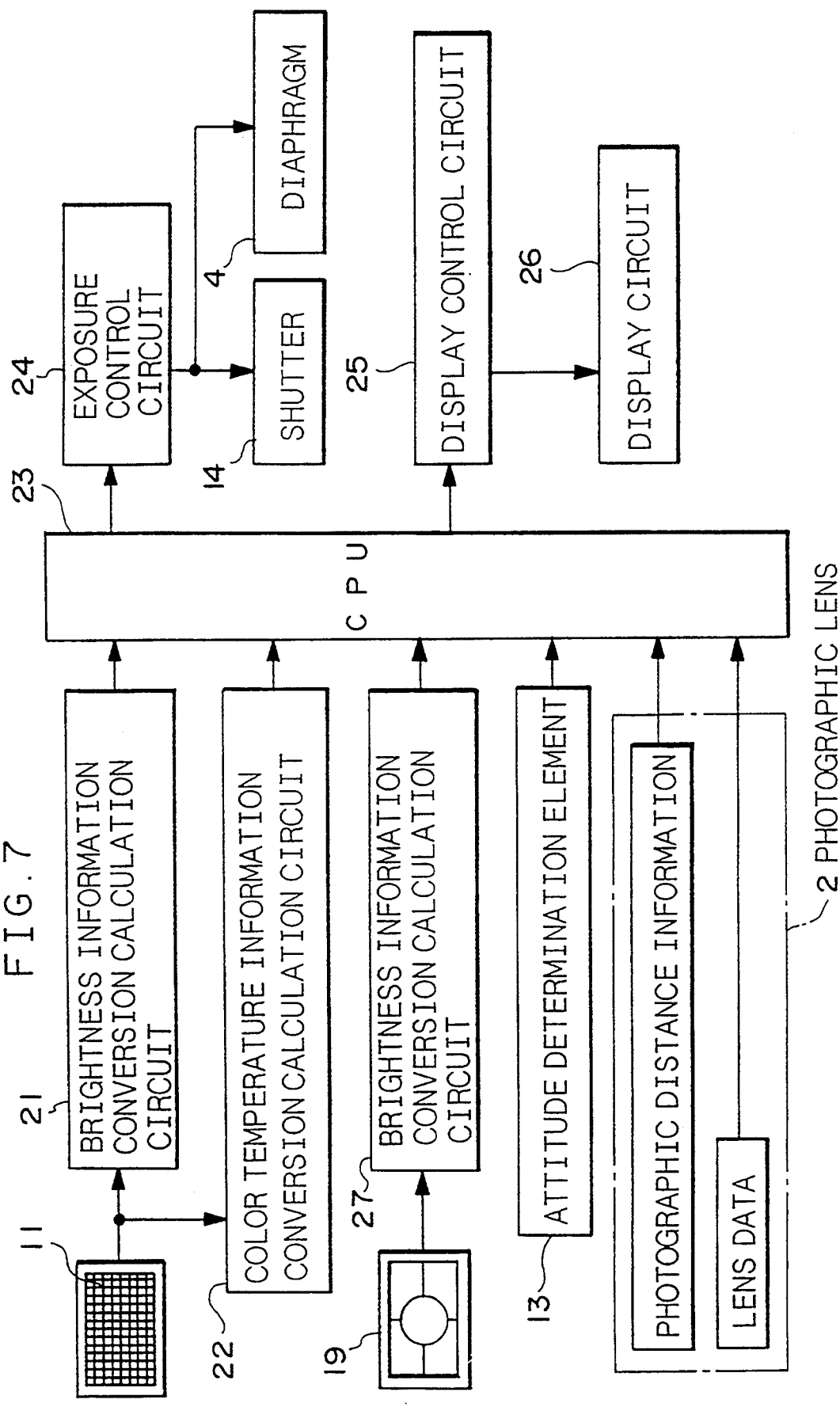
FIG. 7 is a block diagram of the present invention.

FIG. 7 is a block diagram of the present invention.

The outputs LV(m,n) of the photometric device 11 on a one hand are conversion calculated into brightness values BV(m,n) by a brightness information conversion calculation circuit 21 of a known type and are input to a CPU 23, and on another hand are conversion calculated into a color temperature CT by a color temperature information conversion calculation circuit 22 of a known type and are input to the CPU 23. The photometric device 11 is a sensor of a type which accumulates the outputs of the photoelectric elements as electric charges for a predetermined time period, and reads out the accumulated electric charges in order, and, since a comparatively high bias voltage is supplied to the photoelectric elements, there is the problem that when the dark current is increased and the noise level rises, the low luminance photometric capability is bad. In particular, this problem becomes greater in high temperature conditions. Now, the internal structure of the known type color temperature information conversion calculation circuit 22 will be explained hereinafter with reference to FIG. 8 through FIG. 10.

The outputs CV(n) of the photometric device 19 are conversion calculated into brightness values BV(n) by a brightness information conversion calculation circuit 27 of a known type and are input to the CPU 23. The photometric device 19 is a sensor of a type which reads out the outputs of the photoelectric elements as electric current values in real time, and, since a comparatively low bias voltage is supplied to the photoelectric elements, there is no problem of the dark current deteriorating the photometric capability when the luminance is low, as there was with the photometric device 11. Even in high temperature conditions no problem occurs.

The attitude determination element 13 determines the attitude of the camera body 1 and inputs its result to the CPU 23. In concrete terms, the result of attitude determination is a discrimination between three attitudes: the horizontal position; a vertical position in which the pentaprism 7 is on its right hand side; and a vertical position in which the pentaprism 7 is on its left hand side.

From the photographic lens barrel 2, the photographic distance information X obtained from the position of the photographic lens 3 and lens data such as information relating to the aperture amount of the diaphragm 4 and the like are input to the CPU 23 within the camera body 1.

The CPU 23 calculates the most suitable exposure value BVans based upon the above described information which has been input, and displays it on a display circuit 26 via a display control circuit 25. The calculation of the most suitable exposure value BVans will be described hereinafter with reference to FIG. 12 and the following.

After this, by a release button which is not shown in the figures being pressed, an exposure control circuit 24 drives the shutter 14 and the diaphragm 4, and performs control to the calculated exposure value BVans.

Figure 8:
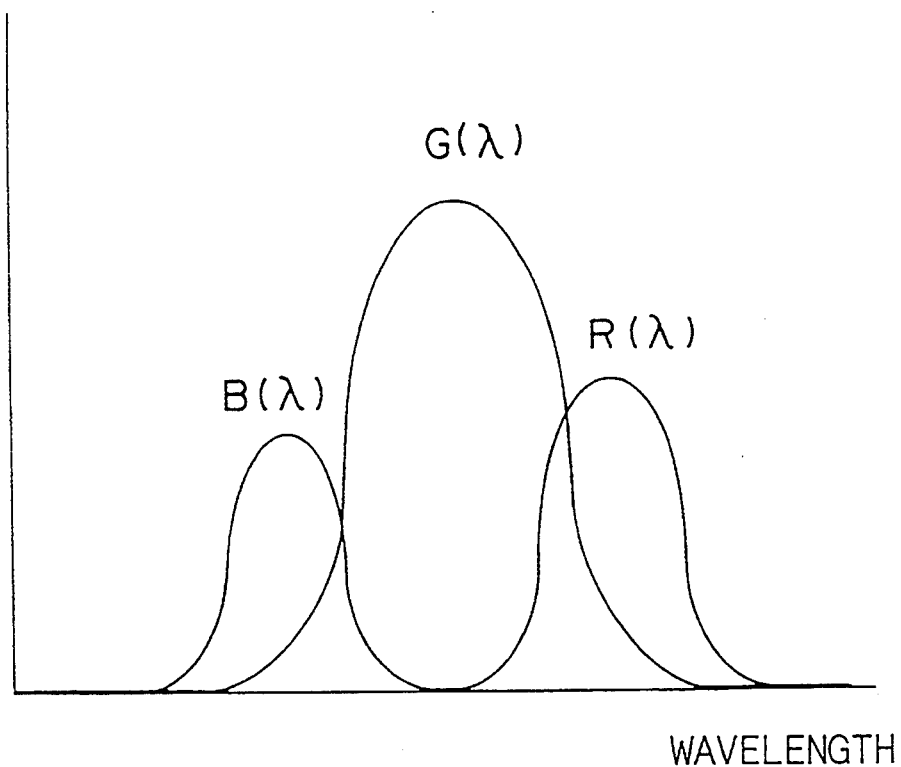
FIG. 8 is a spectral sensitivity characteristic of the three colors of FIG. 5.
Figure 9:
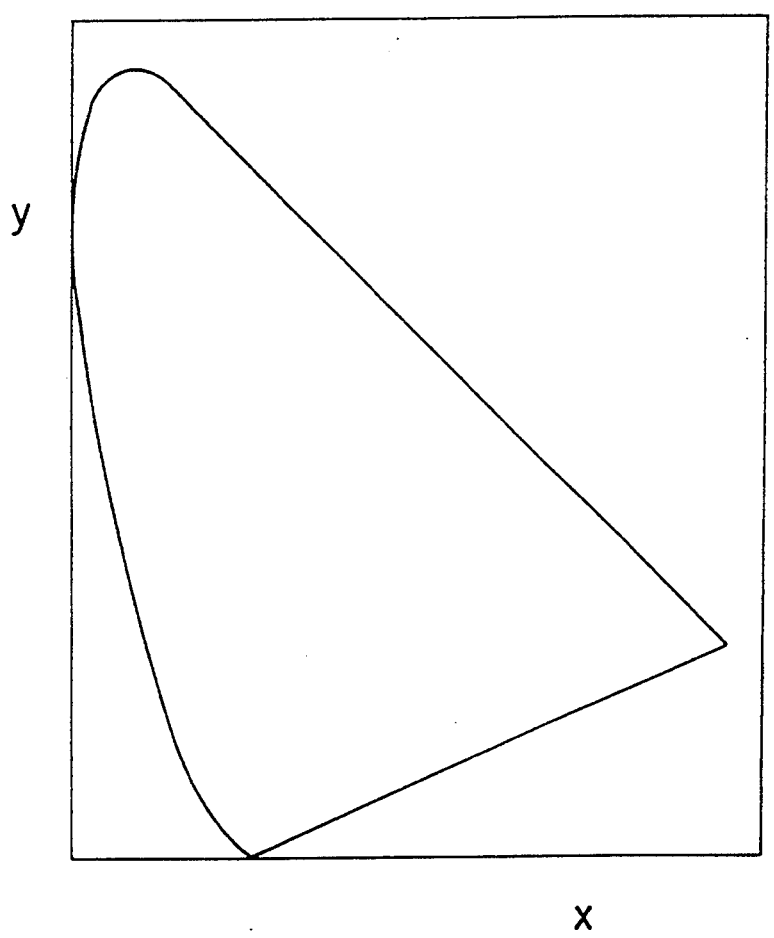
FIG.9 is an xy chromaticity diagram.
Figure 10:
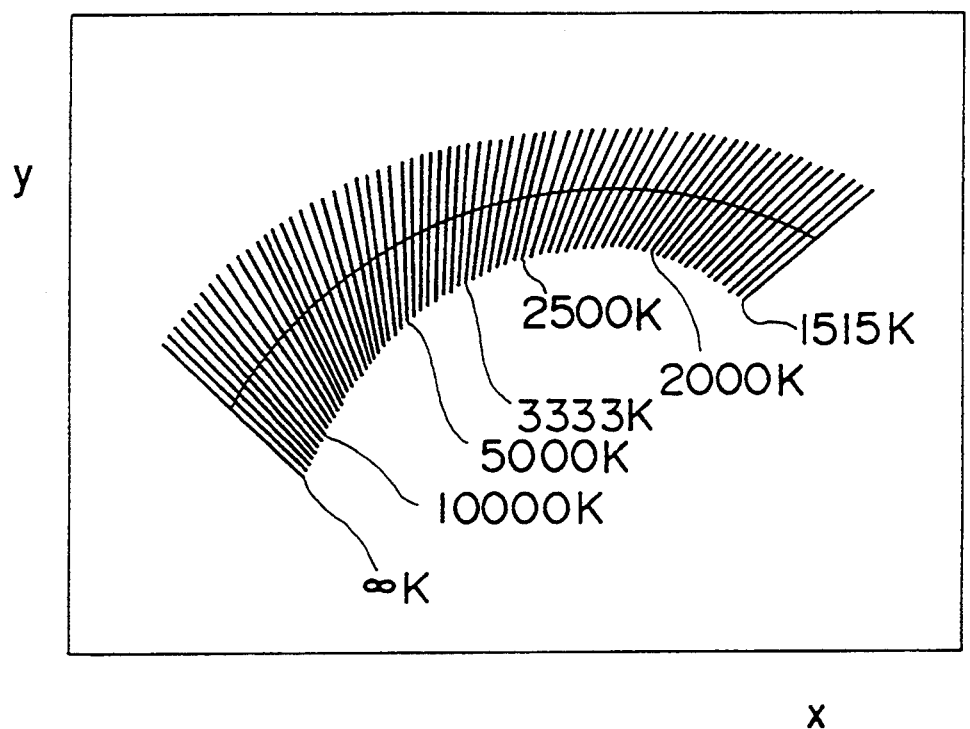
FIG. 10 is a figure showing the Planckian locus and the isocolor-temperature lines.

FIG. 8 through FIG. 10 provide a theoretical explanation of the color temperature information conversion calculation circuit 22 of FIG. 7.

FIG. 8 is a spectral sensitivity characteristic for the three colors of FIG. 5, and shows wavelength along the horizontal axis and sensitivity along the vertical axis. The red sensitivity is shown by $R(\lambda)$, the green sensitivity is shown by $G(\lambda)$, and the blue sensitivity is shown by $B(\lambda)$.

If the outputs from the light receiving unit having these sensitivities $R(\lambda)$, $G(\lambda)$, and $B(\lambda)$ are termed X, Y, and Z, then the chromaticity coordinates x and y are determined by the following equations:

$$x = \frac{X}{X + Y + Z}$$

$$y = \frac{Y}{X + Y + Z}$$

FIG. 9 is a xy chromaticity diagram. All of the colors are positioned on the inside of the horseshoe shape or on the line, and the color of a region can be obtained from the x,y values obtained from the previous equation.

FIG. 10 is a diagram showing the Planckian locus and the isocolor-temperature lines. The color temperature is determined by looking at which the isocolor-temperature line the x,y values obtained from the previous equation fall on.

According to the present invention, although a third of 1035, i.e. 345, items of color temperature are obtained, the color temperature information conversion calculation circuit 22 sums and averages these to obtain an overall color temperature.

Figure 11:
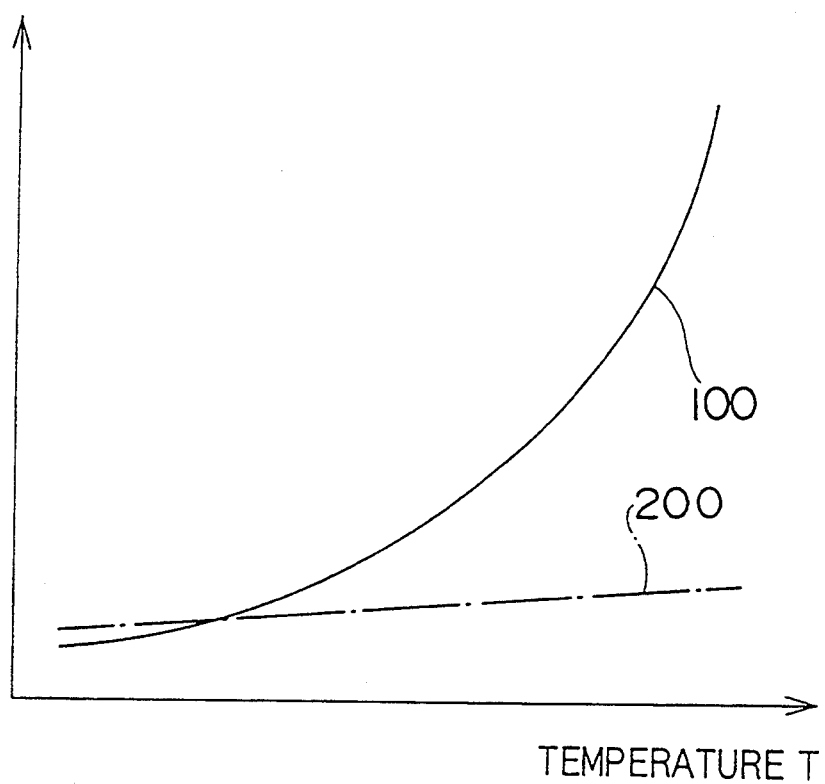
FIG. 11 is a figure showing the temperature characteristics in relation to the dark currents of the first and the second photometric devices.

FIG. 11 is a figure showing the relationship between the values of the dark currents generated by the photometric device 11 and by the photometric device 19 according to the temperature T. The curve 100 is the temperature characteristic of the photometric device 11, and with rise of the temperature T the value of the dark current rises steeply. The curve 200 is the temperature characteristic of the photometric device 19, and with rise of the temperature T the valine of the dark current rises comparatively gently. There is no great difference between the curve 100 and the curve 200 at low temperatures (for example below 0° C.), and no problem arises with the level of the dark current; but at normal temperatures (for example about 20° C.) the level of the dark current from the photometric device 11 increases and exerts an influence upon the low luminance photometric capability; while at high temperatures (for example about 60° C.) the situation arises that it is not possible to perform photometry at low luminance levels (for example about 3 EV).

Figure 12:
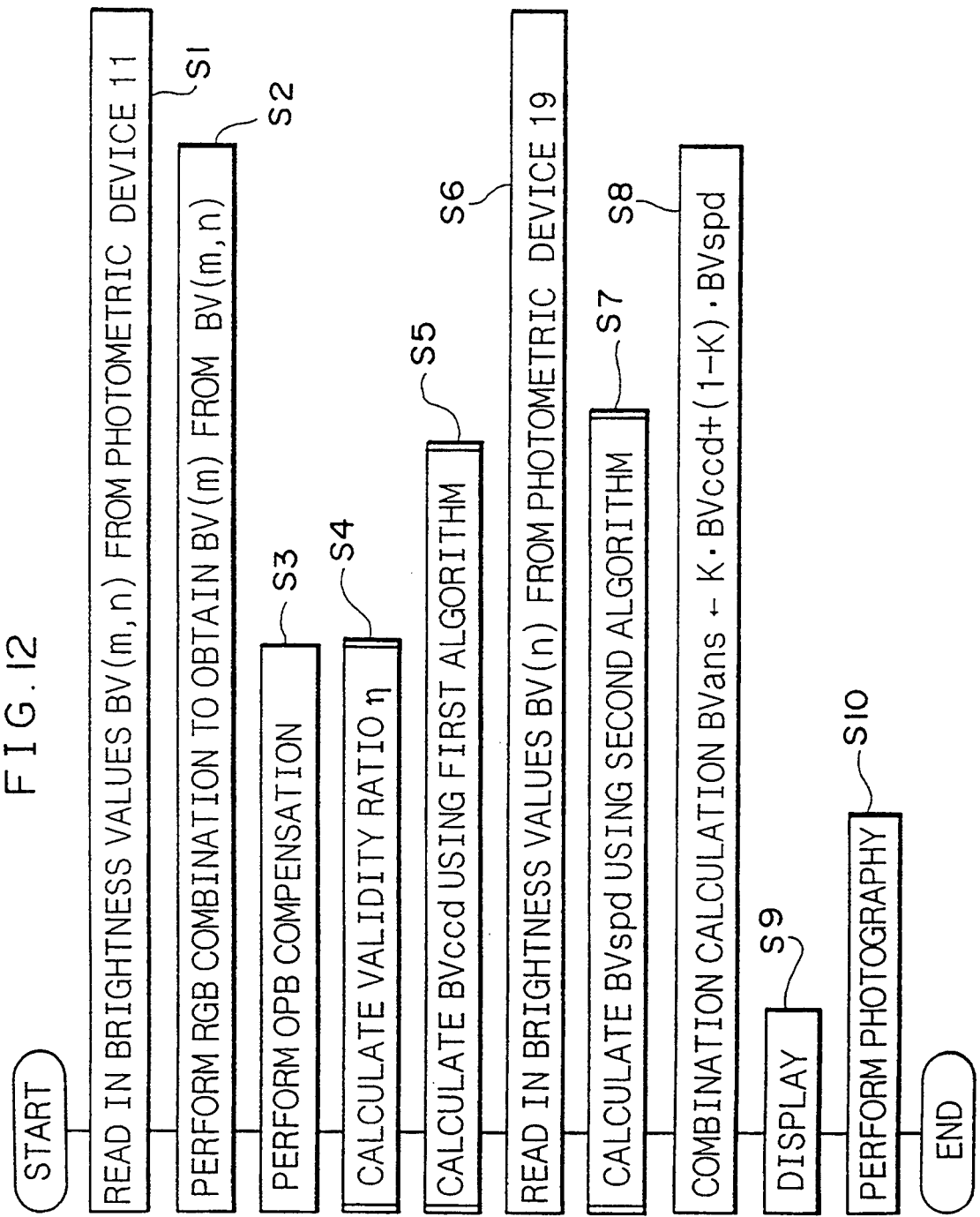
FIG. 12 is a figure showing the main algorithm of the CPU 23 of FIG. 7.

FIG. 12 shows the main algorithm of the CPU 23 of FIG. 7.

In the step S1, photometry is performed by the photometric device 11, and the brightness values BV(m,n) as converted by the brightness information conversion calculation circuit 21 are read in.

In the step S2, 345 units of output BY(m) are calculated from the 1035 units of output, by combining three units of output at a time from elements neighboring one another in the horizontal direction. The combination of three outputs neighboring one another in the horizontal direction, as will be clear from FIG. 5, yields a three color RGB combination.

In the step S3, OPB compensation is performed by subtracting the dark current measured by the optically black portion 11$d$ from the brightness values BV(m)

In the step S4, the validity ratio $\eta$ is calculated as being the proportion of outputs among the brightness values BV(m) for which the difference from the dark current is large so that the reliability as data is high, and which therefore are to be used as data for exposure calculation. The details are expounded hereinafter with reference to FIG. 13.

In the step S5, using the brightness values BV(m) obtained from the photometric device 11, an exposure value BVccd is calculated according to a first algorithm. The details of this first algorithm are expounded hereinafter with reference to FIG. 14.

In the step S6, photometry is performed by the photometric device 19, and the brightness values BV(n) as converted by the brightness information conversion calculation circuit 27 are read in.

In the step S7, using the five brightness values BV(n) obtained from the photometric device 19, an exposure value BVspd is calculated according to a second algorithm. The details of this second algorithm are expounded hereinafter with reference to FIG. 15. However, in the case that the photometric device 19 is of the type shown in FIG. 3 which performs photometry of a single unitary region, no calculation according to the second algorithm is required.

Figure 16:
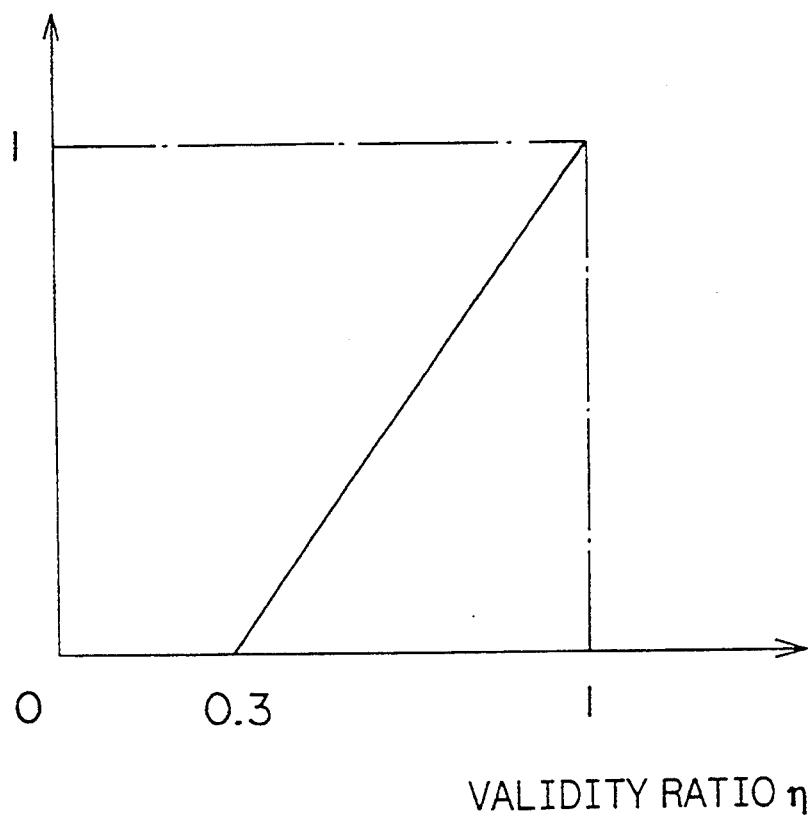
FIG. 16 is a figure showing the relationship between the validity ratio $\eta$ and the contribution ratio of BVccd to BVans.

In the step S8, the most suitable exposure value BVans is calculated as a combination according to the following equation:

$$BVans = K \cdot BVccd + (1-K) \cdot BVspd$$

from the value BVccd which was obtained in the step S5, the value BVspd which was obtained in the step S7, and the contribution ratio K of BVccd to BVans which is obtained according to FIG. 16 based upon the validity ratio $\eta$ which was obtained in the step S4.

The contribution ratio K to BVans is an amount determined unmistakably according to the validity ratio $\eta$ as shown in FIG. 16, and, in comparatively high luminance when the output of the photometric device 11 is large compared to the dark current, the validity ratio $\eta$ is equal to 1, so that the contribution ratio K of BVccd to BVans is equal to 1.

However, in comparatively low luminance when some of outputs of the photometric device 11 exceed the magnitude of the dark current, the validity ratio $\eta$ comes to be less than 1, and the contribution ratio K of BVccd to BVans also drops smoothly according to this.

Further, when the luminance becomes even lower and when the number of the outputs of the photometric device 11 levels of which become of similar magnitude compared to the dark current, comes to be greater than 70%, the validity ratio $\eta$ comes to be less than 0.3, then the contribution ratio K of BVccd to BVans is equal to zero, and it comes to be the output of BVspd alone.

By calculating the validity ratio $\eta$ as above, and by determining according to it the contribution ratio to the final exposure value of the two kinds of exposure value obtained from the two kinds of photometric system, the final exposure value is determined by a process of combination calculation, and therefore no abrupt stepwise change occurs when changing over, although the two different kinds of photometric system are being used.

In the step S9, the calculated value of BVans is displayed on the display circuit 26 via the display control circuit 25.

And, in the step S10, by a pressing release button not shown in the figures, the exposure control circuit 24 drives the shutter 14 and the diaphragm 4, and completes photography while performing control according to the calculated value of BVans.

Figure 13:
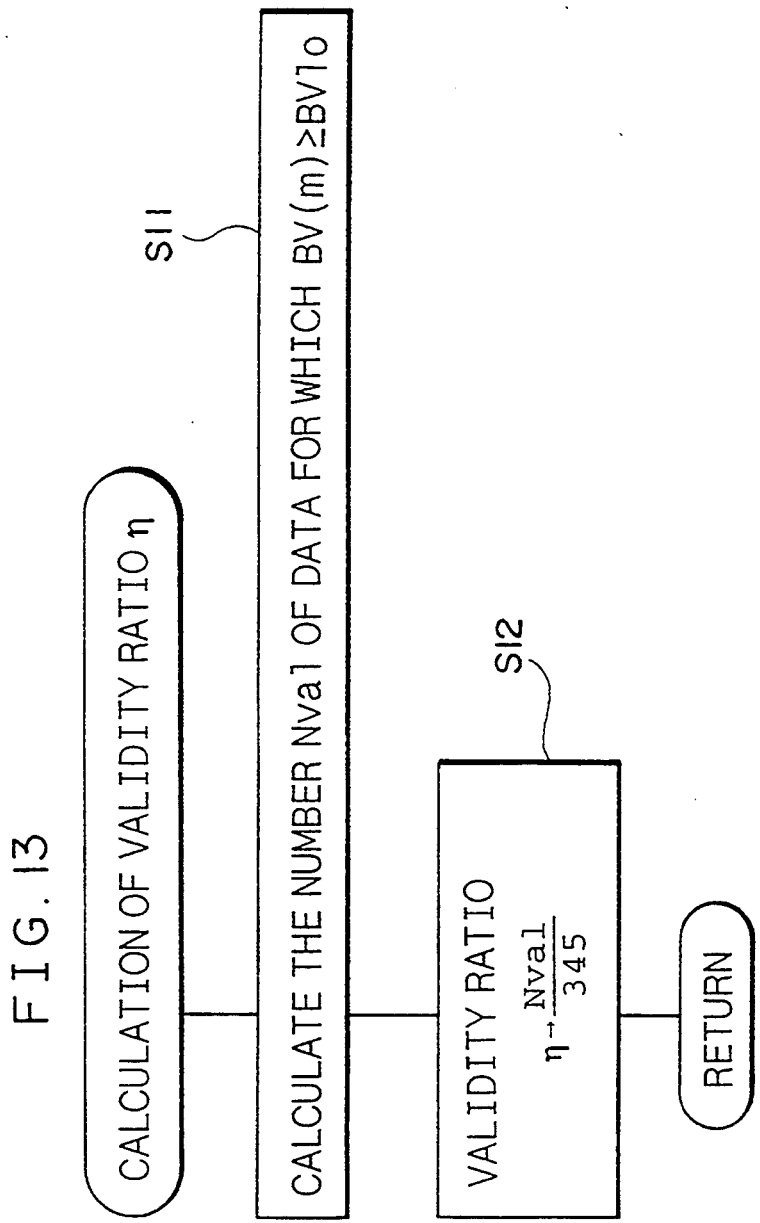
FIG. 13 is the details of the calculation of the validity ratio $\eta$.

FIG. 13 illustrate the details of the calculation of the validity ratio $\eta$.

In the step S11, the number Nval of BV(m) which satisfy the inequality $$BV(m) \geq BVlo$$

is calculated. Here the BV(m) are the values after the OPB compensation in the step S3 has been performed, and, if a value before the OPB compensation is a small value of the order of the dark current, then the value after the OPB compensation is a very small value close to zero. If the OPB compensation is performed in software, it can also happen that the value after OPB compensation becomes a negative value. Accordingly, BVlo is set to a small positive value, and it is possible to decide whether or not a value BV(m) is a value which should be positively used for exposure calculation, according to whether or not the above inequality is satisfied or not.

In the step S12, the validity ratio $\eta$ is calculated according to $$\eta = \frac{Nval}{345}$$

When the luminance is comparatively high, all 345 of the BV(m) data values are large, and Nval comes to be equal to 345, so that the validity ratio comes to be equal to 1. On the other hand, when the luminance is correspondingly low, all 345 of the BV(m) data values come to be small values of the order of the dark current, so that Nval comes to be equal to zero, and the validity ratio $\eta$ comes to be equal to zero.

Figure 14:
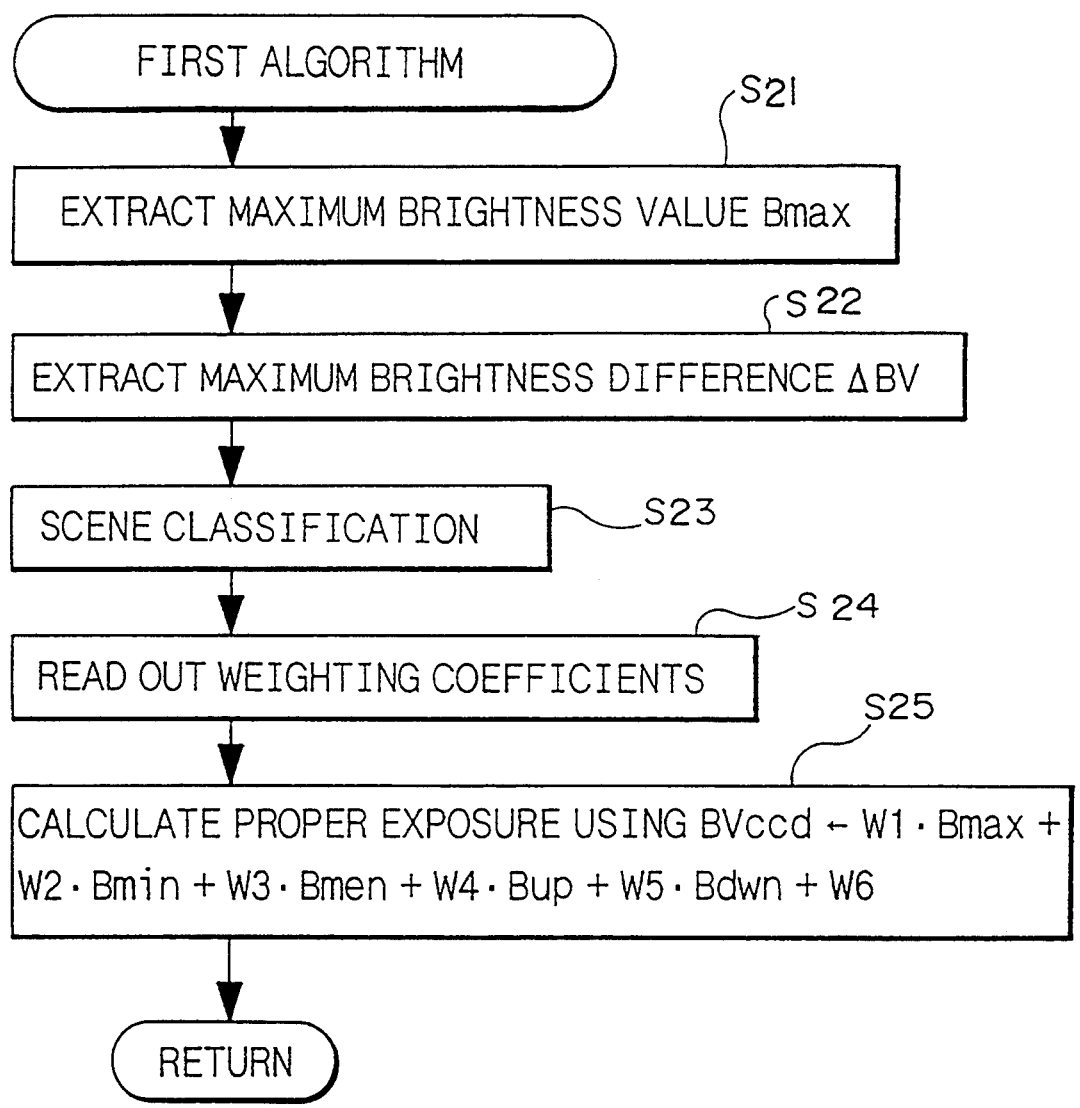
FIG. 14 is the details of the first algorithm.

FIG. 14 illustrates the details of the first algorithm.

In the step S21, divided photometry is performed by the photometric device 11, and the maximum brightness value Bmax is extracted from among the 345 RGB combined items of brightness data BV(m).

In the step S22, divided photometry is performed by the photometric device 11, and the maximum brightness difference value $\Delta$BV is extracted from among the 345 RGB combined items of brightness data BV(m).

In the step S23, classification of the scene is performed according to the scene classification table of FIG. 17, in which the maximum brightness value Bmax and the maximum brightness difference value $\Delta$BV are taken as parameters. For example, when the maximum brightness value Bmax is 6 and the maximum brightness difference value $\Delta$BV is 3, then the scene is classified as "SC-5".

In the step S24, based upon the classified scene, six weighting coefficients W1 through W6 are read out from FIG. 18. For example, when the scene has been classified as SC-5, W1, W2, W3, W4, W5, and W6 are respectively given by W51, W52, W53, W54, W55, and W56.

In the step S25, a proper exposure value is calculated according to the equation below:

$$BVccd = W1 \cdot Bmax + W2 \cdot Bmin + W3 \cdot Bmen + W4 \cdot Bup + W5 \cdot Bdwn + W6$$

in which:
Bmax: the maximum value among the 345 items of brightness data for which divided photometry has been performed by the photometric device 11 and which have been RGB combined;
Bmin: the minimum value among the 345 items of brightness data for which divided photometry has been performed by the photometric device 11 and which have been RGB combined;
Bmen: the arithmetical mean value of the 345 items of brightness data for which divided photometry has been performed by the photometric device 11 and which have been RGB combined;
Bup: the arithmetical mean value of the 8 heavenward rows of RGB combined brightness data from the photometric device 11; and:
Bdwn: the arithmetical mean value of the 8 earthward rows of RGB combined brightness data from the photometric device 11.

Now, herein, the discrimination between heavenward and earthward is performed according to the attitude determination element 13.

Figure 15:
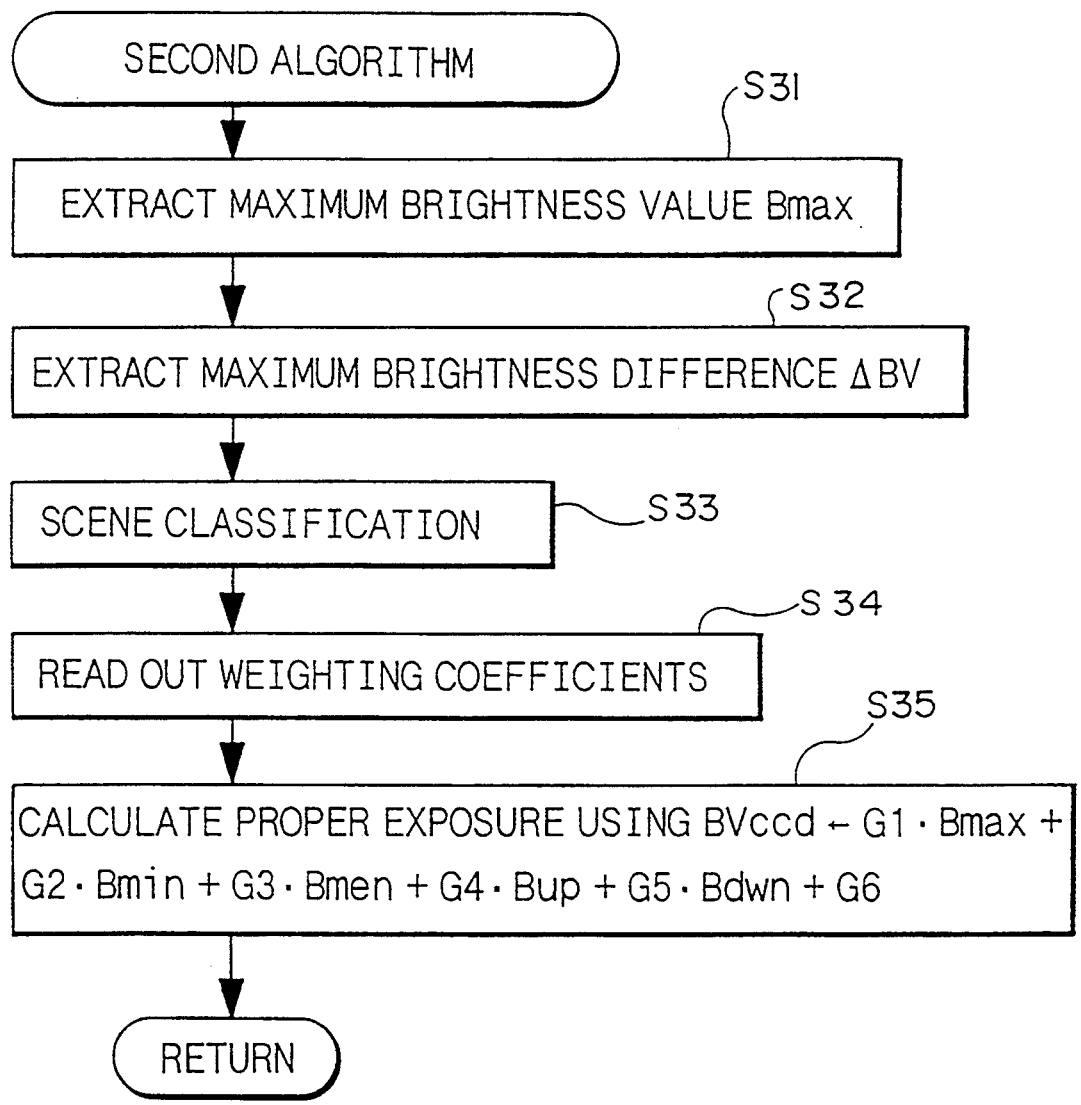
FIG. 15 is the details of the second algorithm.

FIG. 15 is the details of the second algorithm.

In the step S31, the maximum brightness value Bmax is extracted from among the 5 items of brightness data for which divided photometry has been performed by the photometric device 19.

In the step S32, the maximum brightness difference value $\Delta$BV is extracted from among the 345 RGB combined items of brightness data for which divided photometry has been performed by the photometric device 19.

In the step S33, classification of the scene is performed according to the scene classification table of FIG. 17, in which the maximum brightness value Bmax and the maximum brightness difference value $\Delta$BV are taken as parameters. For example, when the maximum brightness value Bmax is 6 and the maximum brightness difference value $\Delta$BV is 3, then the scene is classified as "SC-5".

In the step S34, based upon the classified scene, six weighting coefficients G1 through G6 are read out from FIG. 19. For example, when the scene has been classified as SC-5, G1, G2, G3, G4, G5, and G6 are respectively given by G51, G52, G53, G54, G55, and G56.

In the step S35, a proper exposure value is calculated according to the equation below:

$$BVspd = G1 \cdot Bmax + G2 \cdot Bmin + G3 \cdot Bmen + G4 \cdot Bup + G5 \cdot Bdwn + G6$$

in which:
Bmax: the maximum value among the 5 items of brightness data for which divided photometry has been performed by the photometric device 19;
Bmin: the minimum value among the 5 items of brightness data for which divided photometry has been performed by the photometric device 19;
Bmen: the arithmetical mean value of the 5 items of brightness data for which divided photometry has been performed by the photometric device 19;
Bup: the arithmetical mean value of the 2 heavenward brightness data items from the photometric device 19; and:
Bdown: the arithmetical mean value of the 2 earthward brightness data items from the photometric device 19.

Now, herein, the discrimination between heavenward and earthward is performed according to the attitude determination element 13.

As above, according to the present invention, since a first photometric device which divides the photographic field into a plurality of regions and performs photometry, and second photometric device for which by comparison with said first photometric device the separation number is lower and which excels at low luminance photometric performance, are provided, and since the exposure calculation device for a camera is constructed so as to calculate an exposure value in a comparatively high luminance situation by dominantly using the output of said first photometric device, and in a comparatively low luminance situation by dominantly using the output of said second photometric device, thereby, since photometry is performed in comparatively high luminance by dividing up the photographic field finely and therefore into many regions, a proper exposure will be obtained with an extremely high probability; and it also becomes possible to obtain a proper exposure or one close to it, even in a special environment like a situation of comparatively low luminance or high temperature or the like.

Further, the validity ratio $\eta$ is calculated, and according to it a contribution ratio to the final exposure value of the two kinds of exposure value obtained from the two kinds of photometric system is determined, so that, since the final exposure value is determined by a process of combination calculation, no abrupt stepwise change occurs when changing over, although the two different kinds of photometric system are being used.

A second embodiment of the present invention is explained with reference to FIGS. 20 through 31.

Figure 20:
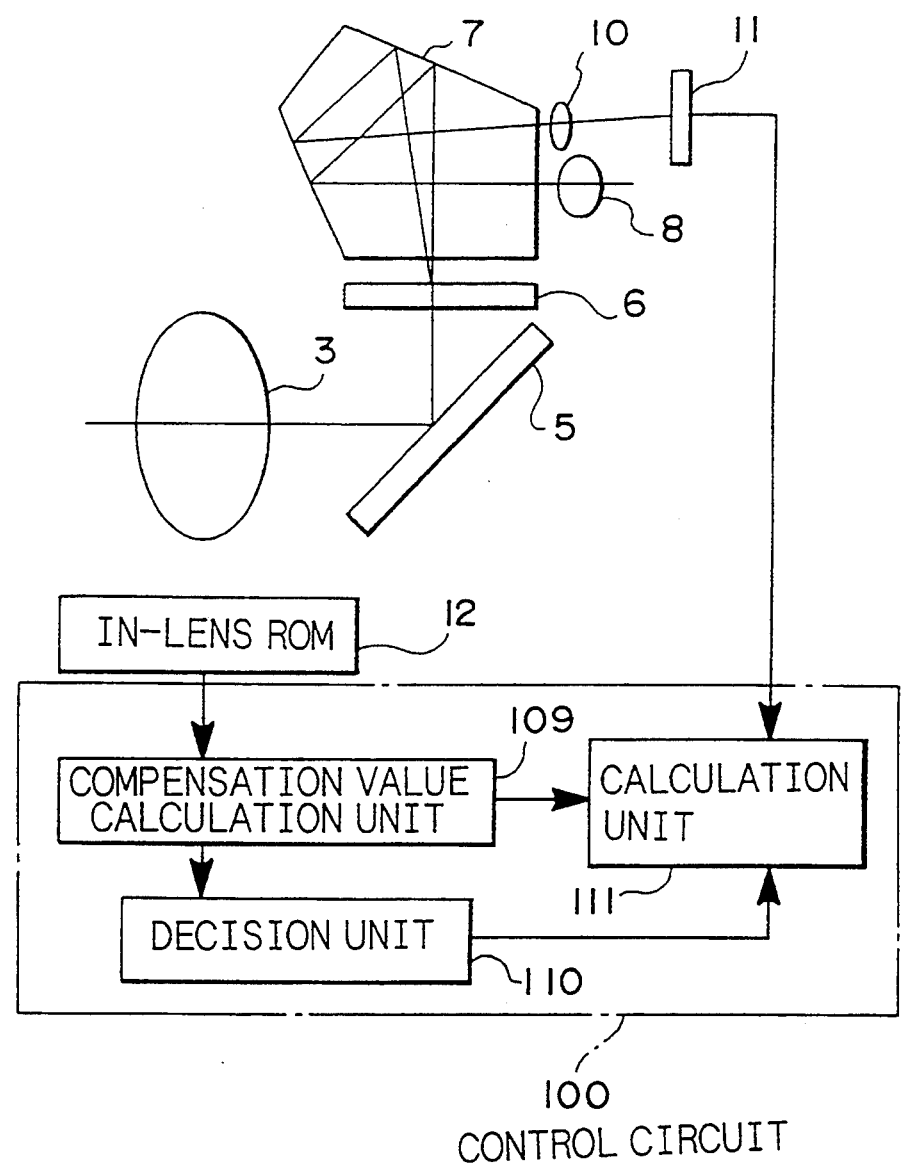
FIG. 20 is a figure showing the construction of the optical system and a control system of a camera according an embodiment.

Referring to FIG. 20, light from an object to be photographed which has passed through a photographic lens 3 is reflected in the upward direction by a quick return mirror 5 and, after having being focused on a diffusion screen 6, passes through a pentaprism 7 and is observed via an eyepiece lens 8. Further, a portion of the light beam which is diffused by the diffusion screen 6 passes through the pentaprism 7 and a lens 10 for photometry and is refocused on a photometric device 11.

Figure 22:
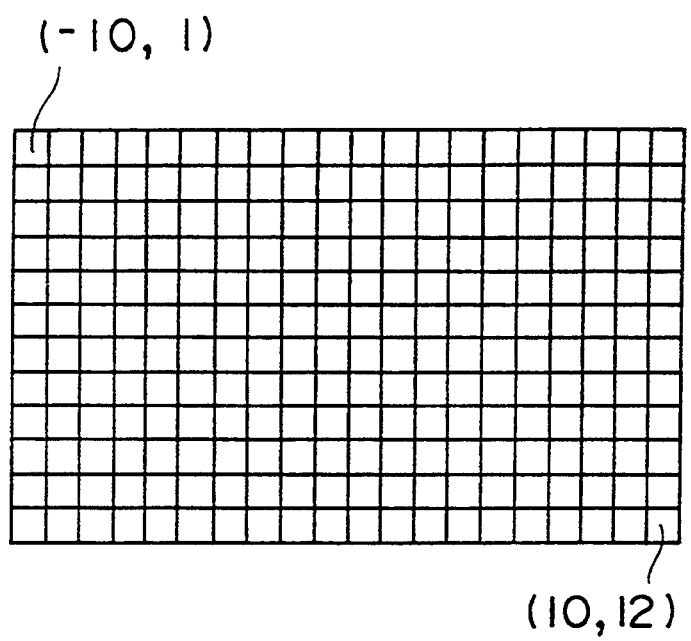
FIG. 22 is a figure showing the division condition of the photometric device.

The photometric device 11 may for example consist of a photoelectric conversion element of the charge accumulation type like a CCD sensor. As shown in FIG. 22, it is made up from a total of 240 segments corresponding to separated photometric regions, the photographic field being divided up into 20 in the horizontal direction and 12 in the vertical direction.

As a designated nomenclature for the photometric regions, the region which is the mth to the right from the central region at the extreme upper portion of the photographic plane and is the nth downwards therefrom will be called the region (m,n). However, if counting to the left of the photographic plane, m=0 is skipped and the count starts from $-1$. For example, the leftmost and topmost region is $(-10,1)$, while the rightmost and lowermost region is (10,12).

The control circuit 100 of FIG. 20 is made up from a compensation value calculation unit 109, a decision unit 110, and a calculation section 111. The compensation value calculation unit 109 reads in an exit pupil position Po and an open aperture value F0 from a in-lens ROM 12 which is provided within the photographic lens, and calculates a compensation value for each of the photometric regions. The decision unit 110 decides, based upon the output of the compensation value calculation unit 109, whether each photometric region is valid or is invalid. And the calculation unit 111 receives the outputs from the compensation value calculation unit 109, the decision unit 110, and the photometric device 11 and performs calculation of a proper exposure value.

Figure 21:
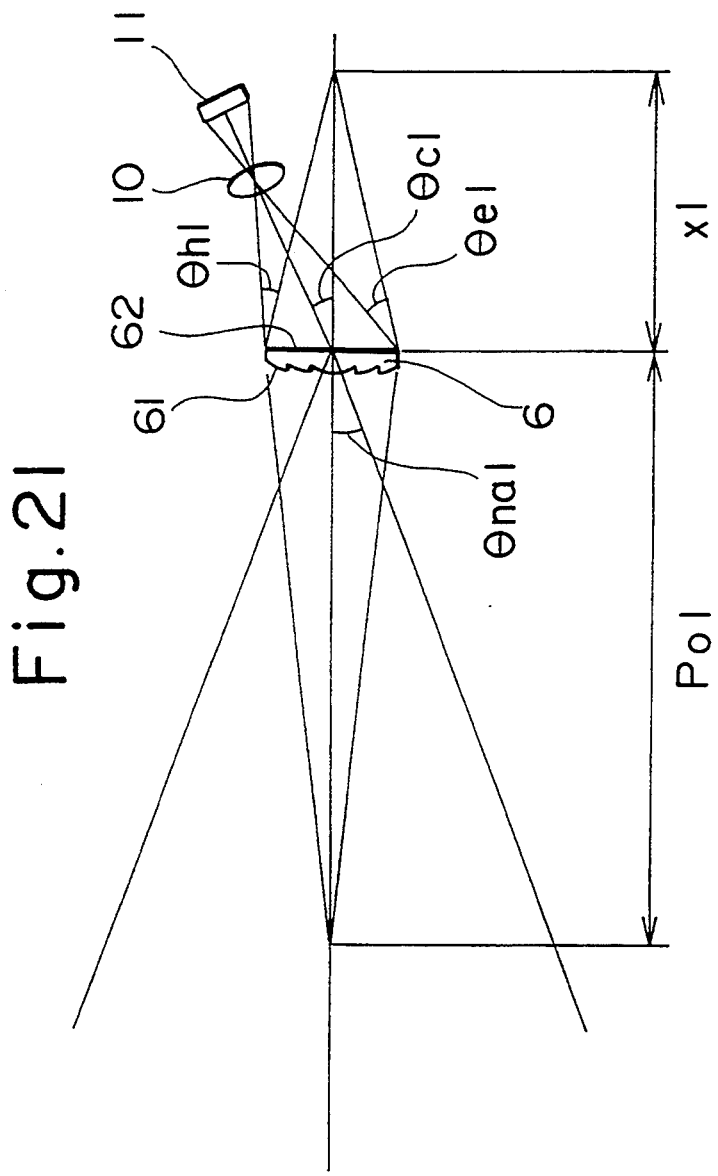
FIG. 21 is a figure showing the photometric optical system.
Figure 23A:
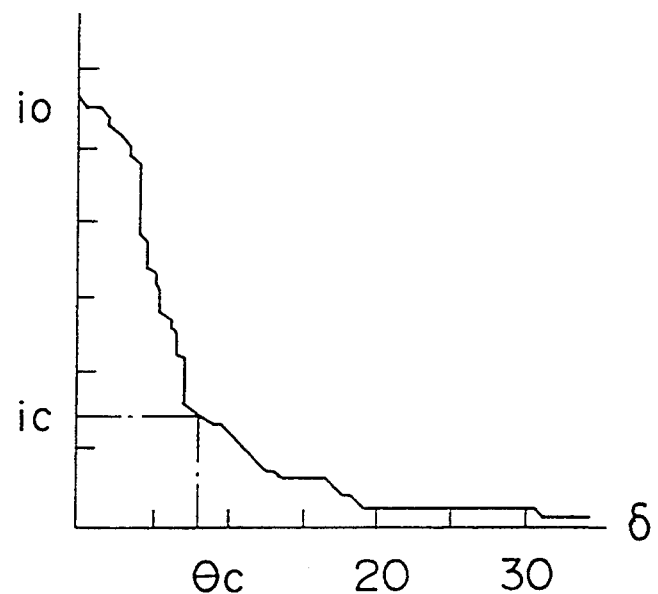
FIG. 23A is a figure showing the diffusion characteristic of the diffusion photographic plane.
Figure 23B:
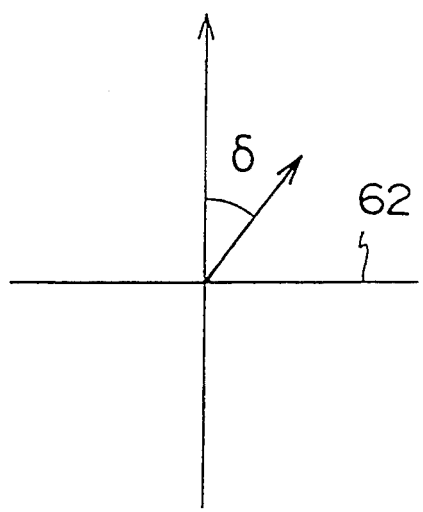
FIG. 23B is a figure showing the relationship of the angle δ.

FIG. 21 is a figure showing the photometric optical system for this embodiment, and the above described diffusion screen 6 has a surface 61 which is formed as a Fresnel lens of focal length f and a diffusion surface 62 which has a diffusion characteristic like FIG. 23A. Now, supposing that a photographic lens with the exit pupil Po1 and the open aperture value F01 is fitted to the camera, the relationship $$F01 = \tfrac{1}{2} \sin(\theta na1)$$

holds between the spreading angle $\theta na1$ of a light beam and the open aperture value F01. Here, the horizontal axis $\delta$ in FIG. 23A is the angle, as shown in FIG. 23B, subtended between a light beam perpendicularly incident upon the diffusion surface 62 and the diffused light; and the vertical axis i is the relative strength of the diffused component in the direction of the angle $\delta$.

A main light beam which is emitted along the optical axis toward the diffusion screen 6 from the exit pupil position which is at a distance Po1 from the diffusion screen 6 is diffused by the diffusion surface 62, but the light beam component which proceeds directly as it is brought to a focus, by being refracted by the Fresnel lens 61, at a position which is at a distance X1, which is given by the following equation:

$$\frac{1}{Po1} + \frac{1}{X1} = \frac{1}{f}$$

Here, f is the focal length of the photographic lens.

On the other hand, the photometric device 11 and the lens 10 for photometry are provided, according to the construction, on an axis which is inclined just at a predetermined angle $\theta c$ from the optical axis of the photographic lens, and are adapted to receive an image on the diffusion screen 6 from a slanting direction. In other words, the light which is incident upon the lens 10 for photometry is not the direct component from the diffusion surface 62, but is a part of the diffused components. Referring to FIG. 23A, the light which proceeds directly through the diffusion surface 62, that is to say the component of the light beam which is along the prolongation of the optical axis of the photographic lens, is of an intensity i0 which corresponds to $\delta = 0$, while on the other hand the component of the light beam which is along the optical axis of the lens 10 for photometry is of an intensity i0 which corresponds to $\delta = \theta c$. As will be understood from this, the weaker the intensity of a light beam directed in the direction of the photometric device 11 via the lens 10 for photometry, the greater is the angle which it subtends with the component transmitted directly through the diffusion surface 62.

To consider the above matters relating to the various portions of the photographic plane, first, the angle which is subtended between a light beam through the central portion of the photographic plane in the direction of the lens 10 for photometry and a light beam (the optical axis of the diffusion screen 6) which is directly transmitted through the diffusion surface 62 is $\theta c1$. On the other hand, at the lower side of the diffusion screen 6, that is to say at the earth surface side of the photographic field, the angle which is subtended with a light beam which is directly transmitted through the diffusion surface 62 is $\theta e1$; and at the upper side of the diffusion screen 6, that is to say at the so called heavenward side of the photographic field, the angle which is subtended in the same way is $\theta h1$. The relationship $$\theta h1 < \theta c1 < \theta e1$$

holds between the angles $\theta c1$, $\theta e1$, and $\theta h1$. Accordingly, the light beam which is led to the photometric device 11 from the heavenward side of the photographic plane is stronger, and from the earthward side is weaker.

Further, to compare portions on the photographic plane which are at identical heights, since the angle $\theta$ subtended with the optical axis of the diffusion screen 6 is smaller the closer to the central portion of the photographic plane, more light is supplied the closer to the central portion of the photographic plane. For ease of understanding, FIG. 25 shows this using contour lines.

Figure 25:
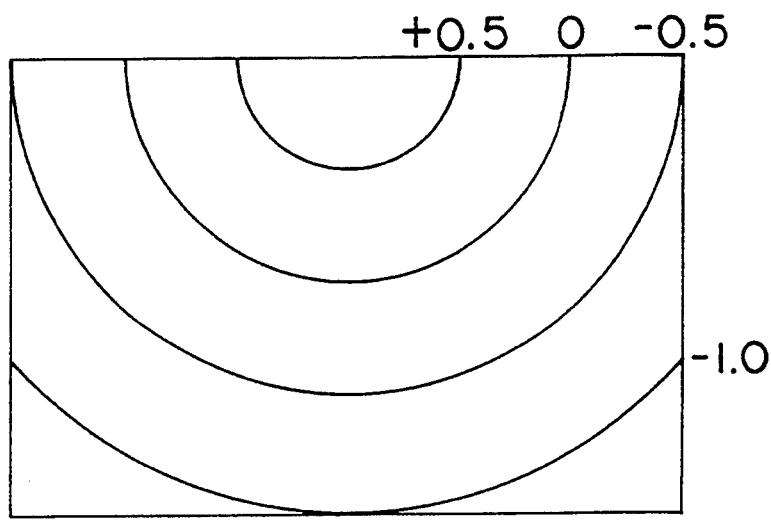
FIG. 25 is a figure showing the positional relationship between luminance at surface of photometric device and the photographic plane.

FIG. 25 shows the element surface luminance on the photometric device 11 when the photographic field is a uniformly illuminated surface, and according to this figure the luminance is the highest at the central portion of the heavenward side of the photographic plane, and according to progress leftwards or rightwards or toward the earthwards side the luminance becomes lower, and this luminance distribution will be understood to be almost in the form of concentric circles centered on a point which is at an upper central portion of the photographic plane or which is outside the visual field above the upper central portion thereof.

Next, an explanation will be given using FIG. 24 regarding when a photographic lens having a different exit pupil Po is fitted.

In FIG. 24, the photometric optical system is shown when a lens is fitted which has an exit pupil Po2 (Po2<Po1) and an open aperture value F02 (F02=F01). At this time, if the main light beam is emitted in a manner identical with FIG. 21 from the exit pupil position toward the diffusion screen 6, the angle $\theta c2$ subtended between the light beam which is diffused and led to the central portion of the photometric lens 10 (the photometric device 11) and the optical axis of the diffusion screen 6 is equal to $\theta c1$ of FIG. 21. Accordingly, on the optical axis of the photometric lens 10, the same amount of light is directed to the photometric device as in the case of FIG. 21.

Figure 26:
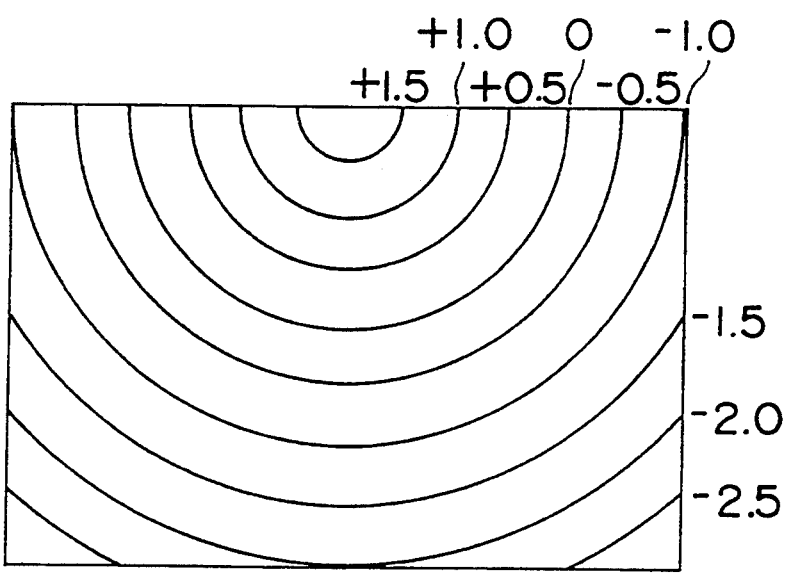
FIG. 26 is a figure identical to FIG. 25.

However, considering the angle $\theta h2$ subtended between the light beam which is directly transmitted through said diffusion screen 6 and the light beam which arrives at the upper portion of the photometric device 11 (the light beam from the upper portion of the photographic plane), $\theta h2 < \theta h1$, and considering the angle $\theta e2$ subtended with the light beam which arrives at the lower portion of the photometric device 11 (the light beam from the lower portion of the photographic plane), $\theta e2 > \theta e1$. Accordingly, by comparison with FIG. 21, the amount of light delivered to the photometric device from the upper portion of the photographic plane is greater, while on the contrary that from the lower portion of the photographic plane is less. FIG. 26 shows the luminance distribution in this case.

From the above it will be understood that, when a uniformly illuminated surface is set as the photographic field, the variation of the element surface luminance on the photometric device 11 becomes greater when the exit pupil position Po is short, as compared to when it is long.

Figure 27:
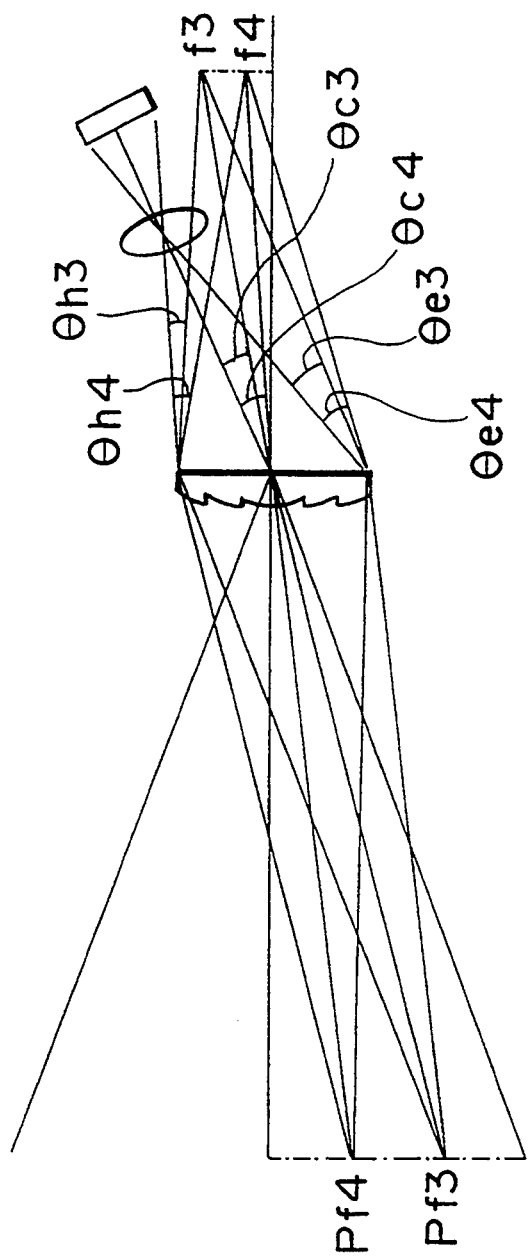
FIG. 27 is a figure showing the photometric optical system.

Next, an explanation will be given using FIG. 27 regarding when a photographic lens having a different open aperture value is fitted.

First, consider the case in which a light beam that has been emitted in the direction of the diffusion screen 6 from a point Pf3 which is off the optical axis but is on the exit pupil position of the photographic lens is located. In the same manner as in the case of FIG. 21, suppose that the angles which are subtended between light beams which pass directly through the diffusion surface 62 and light beams which proceed towards the photometric lens 7 are respectively $\theta h3$, $\theta c3$, and $\theta e3$, and that the angles which are subtended for light beams which are emitted from a point Pf4 toward the optical axis from the point Pf3 at which the exit pupil position is located are $\theta h4$, $\theta c4$, and $\theta e4$. At this time, as will be clear from FIG. 27, these angles stand in the relationships $\theta h3 < \theta h4$, $\theta c3 < \theta c4$, and $\theta e3 < \theta e4$. It will be understood that, since as mentioned above the smaller is the angle $8\theta$ the greater is the amount of light delivered to the photometric device, therefore when the open aperture value F0 is small, i.e. in the case of a large aperture lens, a sufficient amount of light arrives at the photometric device; but when F0 becomes large the amount of light arriving at the photometric device 11 is reduced.

Since the element surface luminance on the photometric device 11 is different in the manner described above for each of its portions, it is not possible to deal with the above described 240 elements of photometric data just as they are, and it is necessary to perform appropriate compensation for each portion. And, since the above described element surface luminance for each portion is related to the exit pupil distance Po and the open aperture value of the photographic lens and to the position (m,n) on the photographic plane, a compensation equation is necessary which includes these parameters, in order to calculate compensation values for the above compensation.

That is to say, as will be understood from FIGS. 25 and 26, considering the relationship between element surface luminance and position on the photographic plane, this is nearly a distribution in circles which are concentric about a central upper portion of the photographic plane as a center; and, further, considering the relationship with the exit pupil distance Po, the smaller Po is, the greater according to variation of the position on the photographic plane does the variation of the element surface luminance become. Further, considering the relationship with the open aperture value F0, the larger F0 is, the less light is transmitted to the photometric device, while when F0 becomes small the light entering the photometric device becomes comparatively large. The above relationships are expressed by the compensation equation:

$$Z(m,n) = k1 \times \sqrt{m^2 + n^2} + k2 \frac{1}{Po} + k3 \cdot F0 + \log_2 \frac{F0^2}{F0s^2} . \quad (1)$$

Here, the Z(m,n) are the compensation values which are to be derived, and k1, k2, and k3 are constants of proportionality, while F0s is the open aperture value F0 of a photographic lens which is to be taken as a reference standard. The compensation values Z(m,n) for the regions which are given by (m,n) have a component which is proportional to the distance $\sqrt{m^2+n^2}$ from the topmost central portion of the photographic plane, a component which is proportional to the open aperture value F0 of the photographic lens, and a component which is inversely proportional to the exit pupil distance Po. Further, the value h $$\log_2 \frac{F0^2}{F0s^2}$$

is a compensation value for the light amount due to difference in the open aperture opening value of the lens. For example, with a standard lens which has an F0 of 1.4, if the F0 of the lens which is to be compensated for is 4, then since the difference in brightness due to the F0 being different is three steps, the compensation value 3 is obtained for the light amount from:

$$\log_2 \frac{4^2}{1 \cdot 4^2} = 3$$

Further, the values of k1, k2, and k3 are determined according to the optical system of the photometric device and according to the diffusion characteristic of the diffusion surface 62 shown in FIG. 23A and the like, and the values of k1, k2, and k3 may be obtained by simulation, or may be set based upon actually measured values.

Figure 28:
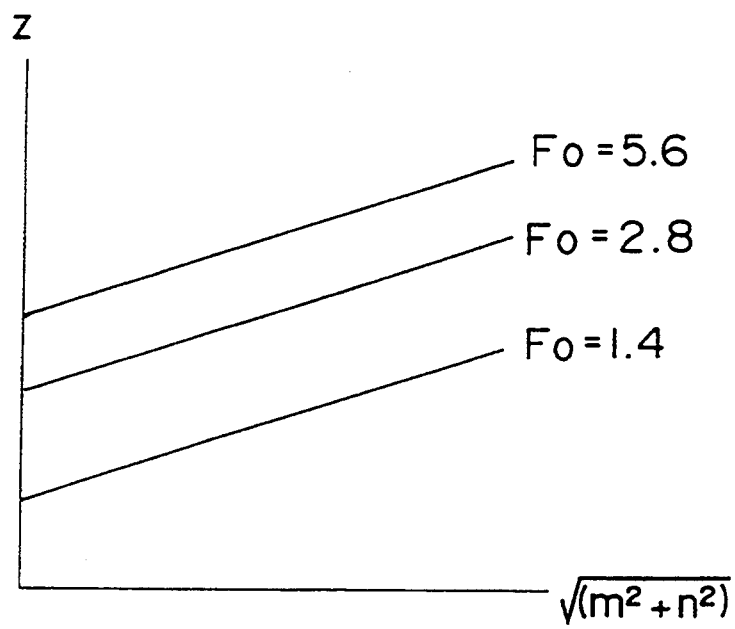
FIG. 28 is a figure showing the relationship between the distance from the upper central portion of the photographic plane and the compensation value.
Figure 29:
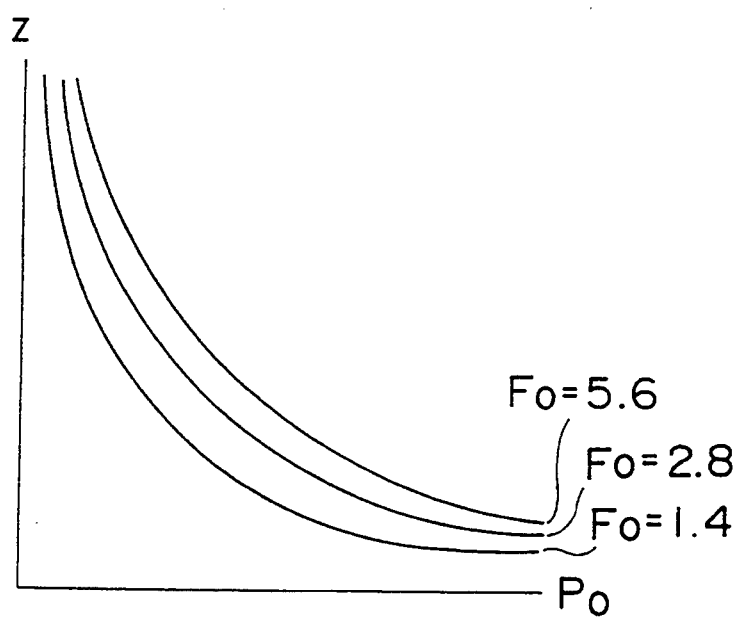
FIG. 29 is a figure showing the relationship between the position of the exit pupil and the compensation value.

FIG. 28 and FIG. 29 show the relationship between $\sqrt{m^2+n^2}$ and Z, and the relationship between Po and Z, as patterns.

Figure 30:
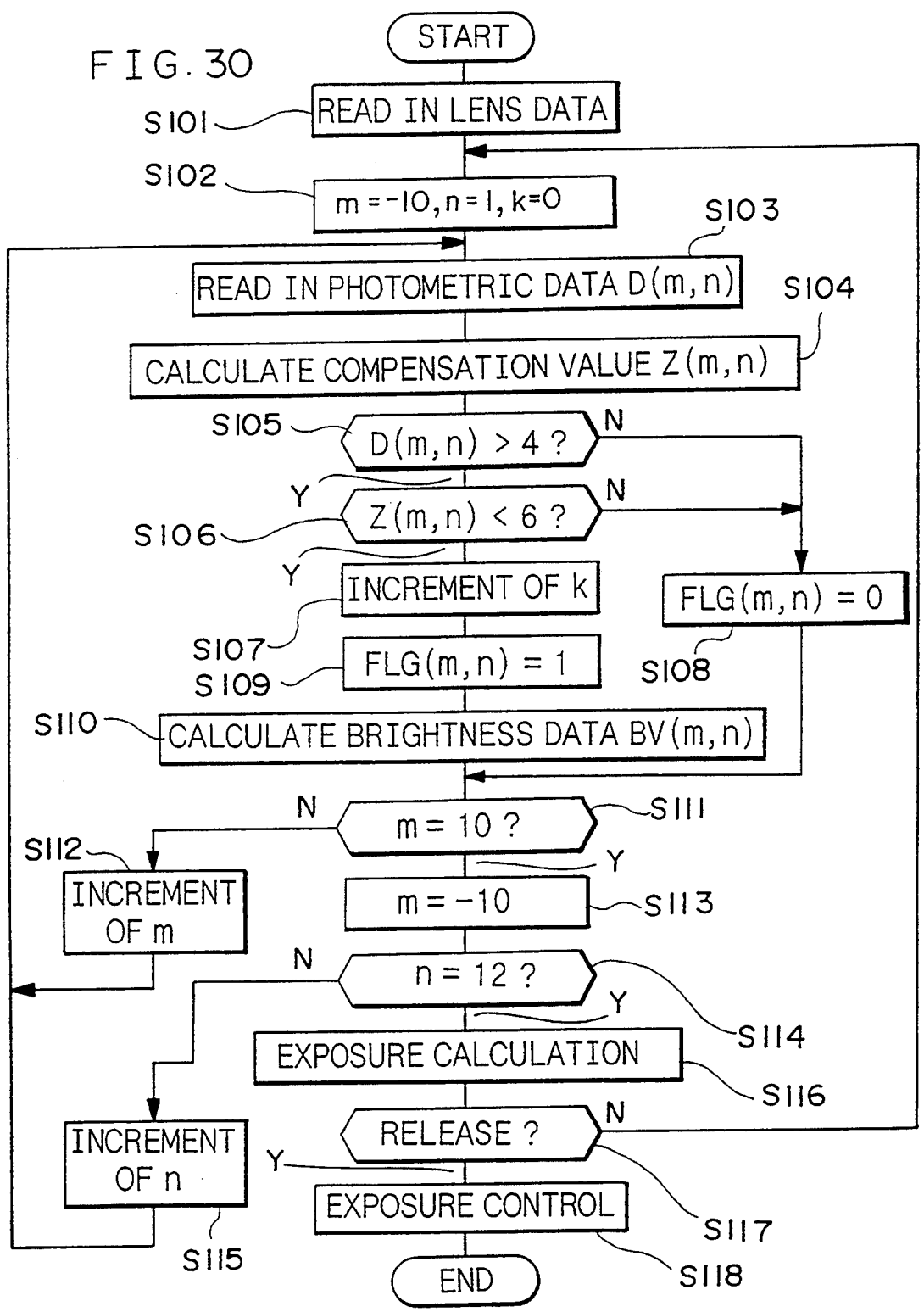
FIG. 30 is a main flow chart for explanation of the operation of an embodiment.

Next, based upon the flow chart of FIG. 30, the procedure of control by the control circuit 100 will be explained.

This program is started when, for example, a release button (not shown in the figures) is pressed down through a half stroke thereof, and first, in the step S101, the exit pupil position Po and the open aperture value F0 of the photographic lens are read in from the in-lens ROM 12, and next in the step S102 the variables m, n, and k are set to $-10$, 1, and 0 which are their respective initial values. Here, m and n are variables which contain the addresses of the photometric regions, while k is a variable which contains the number of valid regions. In the step S103, the photometric data D(m,n) for the photometric region (m,n) is read in. In detail, a voltage signal which is proportional to the luminance coming in from the photometric device 11 is converted into a numerical value by an A/D converter not shown in the figures, and its output is read in. As for the range of the numerical value, the minimum luminance value is 0, and the maximum luminance value is 1023.

Next, in the step S104, the compensation value Z(m,n) for the region (m,n) is calculated according to the above equation (1). In the step S105, a decision is made as to whether or not the photometric data value D(m,n) is greater than 4. That is to say, since the reliability of the signal becomes lower due to noise in the circuit when the voltage signal coming in from the photometric device 11 becomes smaller, when the photometric data value is less than 4 its data is considered as invalid, and the flow of control proceeds to the step S108 in which a flag FLG(m,n) which indicates whether the region (m,n) is valid or is invalid is set to zero, which records the fact that the data is invalid.

In the step S106, a decision is made as to whether or not the compensation value Z(m,n) is less than 6. That is to say, since increase of the compensation value Z shows that the error due to the compensation has become large and accordingly the reliability of the data is lower, therefore, when the compensation value Z is greater than the predetermined value 6, this data item is regarded as invalid because its reliability has become too low, and the flow of control proceeds to the above described step S108.

If in the step S106 a YES decision is reached, then the flow of control proceeds to the step S107, and the variable k which contains the number of valid regions is incremented, and next in the step S109 the flag FLG(m,n) which indicates whether the region (m,n) is valid or is invalid is set to unity, which records the fact that the data is valid. In the step S110 the brightness data BV(m,n) is calculated according to the formula $$BV(m,n) = \log \frac{D(m,n)}{t} + Z(m,n) + C$$

using the photometric data D(m,n), the associated compensation value Z(m,n), and the accumulation time period t when performing photometry. Here, C is an offset value for bringing the brightness value BV(m,n) and the accumulation time period t to correspond with one another.

After the step S110 or the step S108 the flow of control proceeds to the step S111, in which the value of m is evaluated, and if the result of the decision is that m is not equal to 10 then in the: step S112 m is incremented and the flow of control returns to the step S103, while if the result of the decision is that m is equal to 10 then in the step S113 m is set to $-10$. In the step S114 the value of n is evaluated, and if n is not equal to 12 then in the step S115 n is incremented and the flow of control returns to the step S103, while if n is equal to 12 then in the step S116 exposure calculation is performed. The method of exposure calculation will be explained hereinafter.

In the step S117 a decision is made as to whether or not the release button not shown in the figures is being released actuated, and if the result of the decision is NO then the flow of control returns to the step S102, while if the result of the decision is YES then in the step S118 diaphragm not shown in the figures and a shutter are driven and exposure control (photography) is performed.

FIG. 31 is a subroutine flow chart showing the details of the exposure calculation processing of said step S116.

First in the step S201 the average brightness value BVM is calculated, only however using those data values in the photographic field which are valid, i.e. only using those data values for which FLG(m,n)=1, according to the equation $$BVM = \sum_{n=1}^{12} \sum_{m=-10}^{10} \frac{FLG(m,n) \times BV(m,n)}{K}$$

Next in the step S202 the dispersion $\sigma^2$ of the valid data items is calculated according to the equation $$\sigma^2 = \sum_{n=1}^{12} \sum_{m=-10}^{10} \frac{\{FLG(m,n) \times (B(m,n) - BLM)\}^2}{K}$$

In the step S203 a decision is made as to whether or not the dispersion $\sigma^2$ is less than 1, and if the result of the decision is YES then, since the luminance variation over the photographic field is comparatively small, in the step S204 the proper exposure value BVans is set to the average photometric value BVM. However, if the result of the decision in the step S203 is NO, that is if there is the comparative luminance variation over the photographic field, in the step S205 a decision is made as to whether or not the average brightness value BVM is greater than 5 (units BV). If the result of the decision in the step S205 is NO, then, since it is likely that photography is taking place in the evening, at night, or indoors, in the step S206 the proper exposure value BVans is set to the average brightness value BVM as an exposure value as a prerequisite for strobe photography or night photography.

If in the step S205 the result of the decision is YES, then the flow of control proceeds to the step S207, and a decision is made as to whether or not the average photometric value BVM is greater than 15 (units BV). If the result of the decision in the step S207 is NO, then, since it is considered that normal outdoor photography is taking place, in the step S208 the level of backlight is estimated according to the dispersion value $\sigma^2$, and the proper exposure value BVans is calculated as being the average photometric value BVM with a correction included therein, according to the following equation:

$$BVans = BVM - \sigma^2/5$$

Further, if in the step S207 the result of the decision is YES, then, since it is considered that the scene is an extremely bright one such as at the sea shore or on a snowy mountain, in the step S209 the proper exposure value BVans is set to the value 15 which is its limit value.

Further, in the above, although the explanation was made in terms of a photometric device using photoelectric elements of a charge accumulation type, it would also be acceptable to use a photometric device which was not of a charge accumulation type. Further, the method of the division into photometric regions and the number of divisions is not limited to FIG. 21.

According to the present invention, since each of the photometric data values is judged to be valid or invalid based upon a compensation value which is calculated based upon at least information related to the exit pupil of the photographic lens and information related to the open aperture value, and an exposure value is calculated for those of the photometric data values judged as valid based upon the respective values compensated according to the compensation values corresponding to these photometric data values, therefore not only can calculation processing be performed in a short time period since it is not necessary to perform compensation for all of the photometric data items, but also a small capacity memory is sufficient for storage of the compensated values, so that reduction of cost can be envisaged. Further, by taking as invalid those photometric data items for which it is thought that the reliability is low because the compensation values are high, it is possible to obtain an accurate exposure value, and increased reliability can be expected.

According to another aspect of the invention, since the construction is such that when a photometric data value is less than a predetermined value (and it is considered that the noise component is great so that the credibility is low) this photometric data value is taken as invalid, thereby even greater increase of the level of reliability can be expected.

According to yet another aspect of the invention, since the construction is such that an average brightness value is calculated using a photometric data value for a region decided to be valid, and an exposure value is calculated based upon this average brightness value, it becomes possible to calculate an accurate exposure value according to the photographic environment such as in the day time, in the evening, at night, or at the sea shore or on a snowy mountain.

According to still yet another aspect of the invention, since the construction is such that the dispersion of luminance value is calculated using a photometric data value for a region decided to be valid, and an exposure value is calculated based upon this dispersion, it becomes possible to calculate an accurate exposure value according to the magnitude of the luminance variation for the various regions, or the level of backlight.

Further, according to yet another aspect of the invention, since the construction is such that the above described compensation values are changed in proportion to the distance from a standard position on the photographic field to the photometric region which is to be the subject of compensation, a compensation value of high reliability can be obtained regardless of the position on the photographic plane.

Further, according to yet another aspect of the invention, since the construction is such that the compensation values are changed in proportion to the open aperture value of the photographic lens, a compensation value of high reliability can be obtained regardless of the brightness of the photographic lens.

What is claimed is:

1. An exposure calculation device for camera, comprising:
    a photometric device which performs photometry separately for a plurality of photometric regions upon light from an object to be photographed which has passed through a photographic lens into which photographic field is divided, and outputs respectively corresponding photometric data values;
    a compensation value calculation device which, based upon at least information related to an exit pupil of said photographic lens and information related to an open aperture value of said photographic lens, respectively calculates compensation values for compensation of each of said photometric data values;
    a decision device which, based upon said compensation values calculated by said compensation value calculation device, decides whether each of said respective photometric data values is valid or invalid; and
    an exposure value calculation device which calculates an exposure value based upon respective values which are obtained by compensating said photometric data values judged as valid according to said compensation values corresponding to said photometric data values judged as valid, respectively.

2. An exposure calculation device for camera according to claim 1, wherein said decision device decides that photometric data values for which compensation values are greater than a predetermined value, are invalid.

3. An exposure calculation device for camera according to claim 1, wherein said decision device decides that photometric data values which are less than a predetermined value are invalid.

4. An exposure calculation device for camera according to claim 1, wherein said exposure value calculation device calculates a parameter for obtaining an appropriate exposure value using photometric data values for photometric regions for which compensation values are decided to be valid by said decision device, and calculates said exposure value using said parameter.

5. An exposure calculation device for camera according to claim 4, wherein said parameter is an average of brightness values of said plurality of photometric regions.

6. An exposure calculation device for camera according to claim 4, wherein said parameter is dispersion of brightness values of said plurality of photometric regions.

7. An exposure calculation device for camera according to claim 1, wherein said photometric device is equipped with a light receiving element of the charge accumulation type.

8. An exposure calculation device for camera according to claim 1, wherein said compensation value calculation device changes said compensation values in proportion to a distance from a standard position on said photographic field to a photometric region that is to be a subject of compensation.

9. An exposure calculation device for camera according to claim 1, wherein said compensation value calculation device changes said compensation values in proportion to said open aperture value of said photographic lens.

10. An exposure calculation device for camera according to claim 1, wherein said compensation value calculation device calculates said compensation value Z according to said photometric region that is to be a subject of compensation, using a following equation:

$$Z = K1 \cdot D + K2 \cdot (1/Po) + K3 \cdot Fo + \log_2(Fo^2/Fos^2)$$

where said exit pupil of said photographic lens fitted to said camera is Po, said open aperture value of said photographic lens fitted to said camera is Fo, an open aperture value of a standard photographic lens is Fos, a distance between a predetermined photometric region and a photometric region that is to be a subject of compensation is D, and K1, K2 and K3 are constants of proportionality.

11. An exposure calculation device for camera according to claim 10, wherein:
said plurality of photometric regions are arranged in a matrix status,
an address(m,n) of each of said photometric regions is determined so that said distance between said predetermined photometric region and said photometric region that is to be the subject of compensation is calculated as $\sqrt{m^2+n^2}$, and
said compensation value calculation device uses $\sqrt{m^2+n^2}$ instead of D in said equation.

12. An exposure calculation device for camera comprising:
a photometric device that performs photometry separately for a plurality of photometric regions upon light from an object to be photographed that has passed through a photographic lens into which a photographic field is divided, and that outputs respectively corresponding photometric data values;
a compensation value calculation circuit connected to a memory in said photographic lens, said compensation value calculation circuit calculating compensation values for compensating said photometric data values based upon at least information related to an exit pupil of said photographic lens and information related to an open aperture value of said photographic lens;
a decision circuit connected to said compensation value calculation circuit, said decision circuit deciding whether each of said photometric data values is valid or invalid based upon said compensation values calculated by said compensation value calculation circuit; and
an exposure value calculation circuit connected to said photometric device and said decision circuit, said exposure value calculation circuit calculating an exposure value based upon respective values that are obtained by compensating said photometric data values judged as valid according to said compensation values corresponding to said photometric data values judged as valid, respectively.

13. An exposure calculation method for camera comprising the steps of:
performing photometry separately for a plurality of photometric regions upon light from an object to be photographed that has passed through a photographic lens into which a photographic field is divided to output respectively corresponding photometric data values;
calculating compensation values for compensating said photometric data values based upon at least information related to an exit pupil of said photographic lens and information related to an open aperture value of said photographic lens;
deciding whether each of said photometric data values is valid or invalid based upon said calculated compensation values; and
calculating an exposure value based upon respective values that are obtained by compensating said photometric data values judged as valid according to said compensation values corresponding to said photometric data values judged as valid, respectively.

* * * * *